(12) United States Patent
Li et al.

(10) Patent No.: US 11,182,426 B2
(45) Date of Patent: Nov. 23, 2021

(54) AUDIO RETRIEVAL AND IDENTIFICATION METHOD AND DEVICE

(71) Applicant: Beijing Bytedance Network Technology Co., Ltd., Beijing (CN)

(72) Inventors: Gen Li, Beijing (CN); Lei Li, Beijing (CN); Yi He, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

(21) Appl. No.: 16/636,579

(22) PCT Filed: Dec. 29, 2018

(86) PCT No.: PCT/CN2018/125493
§ 371 (c)(1),
(2) Date: Feb. 4, 2020

(87) PCT Pub. No.: WO2019/184518
PCT Pub. Date: Oct. 3, 2019

(65) Prior Publication Data
US 2021/0165827 A1 Jun. 3, 2021

(30) Foreign Application Priority Data
Mar. 29, 2018 (CN) .......................... 201810273699.7

(51) Int. Cl.
*G06F 16/683* (2019.01)
*G06F 16/638* (2019.01)
(Continued)

(52) U.S. Cl.
CPC .......... *G06F 16/683* (2019.01); *G06F 16/632* (2019.01); *G06F 16/638* (2019.01);
(Continued)

(58) Field of Classification Search
CPC .... G06F 16/683; G06F 16/632; G06F 16/638; G10L 25/18; G10L 25/54; G10L 19/02
(Continued)

(56) References Cited

U.S. PATENT DOCUMENTS

2013/0254191 A1  9/2013  He et al.
2013/0259211 A1  10/2013  Vlack et al.
(Continued)

FOREIGN PATENT DOCUMENTS

CN  102132574 A  7/2011
CN  103971689 A  8/2014
(Continued)

OTHER PUBLICATIONS

Anguera et al.; "MASK: Robust Local Features for Audio Fingerprinting"; IEEE Int'l Conf, on Multimedia and Expo; Jul. 2012; p. 455-460.
(Continued)

*Primary Examiner* — Melur Ramakrishnaiah
(74) *Attorney, Agent, or Firm* — BakerHostetler

(57) ABSTRACT

An audio retrieval and recognition method and device are provided. The method includes acquiring an audio fingerprint of a query audio; and recognizing the query audio according to the audio fingerprint to obtain a recognition result. The audio fingerprint includes a first part configured for indicating a content feature of the query audio and a second part configured for indicating credibility of the first part.

20 Claims, 11 Drawing Sheets

Obtaining an audio fingerprint of query audio; wherein the audio fingerprint comprises a first part configured for indicating a content feature of the query audio and a second part configured for showing credibility of the first part — S10

Recognizing the query audio according to the audio fingerprint of the query audio to obtain a recognition result — S20

(51) Int. Cl.
 G06F 16/632 (2019.01)
 G10L 19/02 (2013.01)
 G10L 25/18 (2013.01)
 G10L 25/54 (2013.01)
(52) U.S. Cl.
 CPC .............. *G10L 19/02* (2013.01); *G10L 25/18* (2013.01); *G10L 25/54* (2013.01)
(58) Field of Classification Search
 USPC ............................................ 700/94; 704/270
 See application file for complete search history.

(56) References Cited

U.S. PATENT DOCUMENTS

| | | | |
|---|---|---|---|
| 2014/0310006 | A1 | 10/2014 | Anguera Miro et al. |
| 2015/0254342 | A1 | 9/2015 | Yu et al. |
| 2016/0019882 | A1 | 1/2016 | Matula et al. |
| 2017/0097992 | A1* | 4/2017 | Vouin ...................... G10L 25/51 |
| 2017/0309298 | A1 | 10/2017 | Scott et al. |
| 2018/0047416 | A1* | 2/2018 | Bilobrov ............... G06F 16/683 |
| 2018/0358027 | A1* | 12/2018 | Srinivasan .............. G10L 25/18 |

FOREIGN PATENT DOCUMENTS

| | | | |
|---|---|---|---|
| CN | 104142984 | A | 11/2014 |
| CN | 104778276 | A | 7/2015 |
| CN | 105653700 | A | 6/2016 |
| CN | 106663102 | A | 5/2017 |
| CN | 106940996 | A | 7/2017 |
| CN | 107293307 | A * | 10/2017 |
| CN | 107293307 | A | 10/2017 |
| CN | 107402965 | A | 11/2017 |
| CN | 107577773 | A | 1/2018 |
| CN | 107622773 | A | 1/2018 |
| CN | 107633078 | A | 1/2018 |
| JP | 2004-505328 | A | 2/2004 |
| JP | 2004-519015 | A | 6/2004 |
| WO | WO 2002/011123 | A2 | 2/2002 |
| WO | WO 2002/065782 | A1 | 8/2002 |

OTHER PUBLICATIONS

International Patent Application No. PCT/CN2018/125493; Int'l Search Report; dated Apr. 2, 2019; 2 pages.
Jegou et al.; "BABAZ: A large scale audio search system for video copy detection"; IEEE Int'l Conf. on Acoustics, Speech and Signal Processing; 2012; 5 pages.

* cited by examiner

AUDIO RETRIEVAL AND IDENTIFICATION METHOD AND DEVICE

CROSS-REFERENCE TO RELATED APPLICATIONS

The application is the U.S. National Stage of International Application No. PCT/CN2018/125493, filed on Dec. 29, 2018, which claims the benefit of priority from Chinese Application No. 201810273699.7 filed on Mar. 29, 2018, the entire contents of which are incorporated herein by reference.

TECHNICAL FIELD

The disclosure relates to an audio process technology, in particular to an audio retrieval and recognition method and device.

BACKGROUND ART

An audio fingerprint (or called an audio feature) and audio fingerprint retrieval are widely applied in the current "multimedia information society". The audio fingerprint retrieval is firstly applied to music listening for song searching, i.e., a piece of audio is input, and the fingerprint feature of the audio is extracted and compared to recognize a corresponding song. In addition, the audio fingerprint retrieval can also be applied to content monitoring, such as audio repetition removal, voice advertisement monitoring based on retrieval, audio copyright and the like.

A conventional audio retrieval and recognition method has the problems of poor accuracy and low speed so as to generate huge consumption for operation resources and storage resources.

SUMMARY

An objective of the disclosure is to provide a new audio retrieval and recognition method and device.

The objective of the disclosure is achieved by adopting the technical solution as follows. An audio retrieval and recognition method provided by the disclosure includes following steps: acquiring an audio fingerprint of a query audio; and recognizing the query audio according to the audio fingerprint to obtain a recognition result. The audio fingerprint comprises a first part configured for indicating a content feature of the query audio and a second part configured for indicating credibility of the first part.

The objective of the disclosure can further be achieved by adopting the technical solution as follows.

In the foregoing audio retrieval and recognition method, the process of acquiring an audio fingerprint of a query audio includes: converting the query audio to a spectrogram; determining a feature point in the spectrogram; in the spectrogram, determining one or more masks for the feature point; determining mean energy of each of the plurality of spectrum areas; determining an audio fingerprint bit according to mean energy of the plurality of spectrum areas in the one or more masks; judging credibility of the audio fingerprint bit to determine a weight bit; and determining the audio fingerprint of the query audio according to the audio fingerprint bit and the weight bit. Each of the one or more masks includes a plurality of spectrum areas.

In the foregoing audio retrieval and recognition method, the process of converting the query audio to a spectrogram includes: converting the query audio to a two-dimensional spectrogram of time-frequency by a fast Fourier transformation; a value of each point in the spectrogram indicates energy of the query audio.

In the foregoing audio retrieval and recognition method, the process of converting the query audio to a spectrogram further includes: processing the spectrogram by MEL transformation.

In the foregoing audio retrieval and recognition method, the feature point is a fixed point in the spectrogram.

In the foregoing audio retrieval and recognition method, the feature point is a point whose frequency is equal to a plurality of preset frequency set values.

In the foregoing audio retrieval and recognition method, the feature point is a maximal energy point in the spectrogram, or the feature point is a minimal energy point in the spectrogram.

In the foregoing audio retrieval and recognition method, the plurality of spectrum regions included in the one or more masks are symmetrical distributed.

In the foregoing audio retrieval and recognition method, the plurality of spectrum regions included in the one or more masks have an identical frequency range, and/or an identical time range, and/or are centrosymmetric with the feature point as a center.

In the foregoing audio retrieval and recognition method, the mean energy of the plurality of spectrum regions is a mean value of energy values of all points included in the plurality of spectrum regions.

In the foregoing audio retrieval and recognition method, the process of determining an audio fingerprint bit according to mean energy of the plurality of spectrum areas in the one or more masks includes: determining the audio fingerprint bit according to a difference value of the mean energy of the plurality of spectrum regions included in the one or more masks.

In the foregoing audio retrieval and recognition method, the process of judging credibility of the audio fingerprint bit to determine a weight bit includes: judging an absolute value of the difference value attains or exceeds a pre-set weight bit threshold or not, if it attains or exceeds the pre-set weight bit threshold, determining the audio fingerprint bit to be a strong bit, or else determining the audio fingerprint bit to be a weak bit; determining the weight bit according to the audio fingerprint bit is the strong bit or the weak bit.

In the foregoing audio retrieval and recognition method, the audio retrieval and recognition method further includes: dividing the query audio into a plurality of sub-audio according to time; extracting the audio fingerprint of each of the plurality of sub-audio; and combining the audio fingerprints of the plurality of sub-audio to obtain the audio fingerprint of the query audio.

In the foregoing audio retrieval and recognition method, the audio fingerprint of the query audio is defined as a first audio fingerprint; the first audio fingerprint includes a plurality of first audio fingerprint units and first weight units corresponding to the plurality of first audio fingerprint units; the first audio fingerprint units include the plurality of audio fingerprint bits of the query audio; the first weight units include the plurality of weight bits corresponding to the plurality of audio fingerprint bits.

In the foregoing audio retrieval and recognition method, the process of recognizing the query audio according to the audio fingerprint includes: carrying out a first ranking on a plurality of known audio according to each of the plurality of first audio fingerprint units, according to a result of the first ranking, selecting first k individuals of the plurality of known audio as a first candidate audio collection, where k is a positive integer; and carrying out a second ranking on the first candidate audio collection according to the first audio fingerprint units sequentially arranged, according to a result of the second ranking, selecting first n individuals of the first candidate audio collection as the recognition result, where n is a positive integer.

In the foregoing audio retrieval and recognition method, the audio retrieval and recognition method further includes: pre-acquiring audio fingerprint of the plurality of known audio as second audio fingerprints; and pre-acquiring fingerprint indexes of the plurality of known audio by indexing the second audio fingerprints; the second audio fingerprints include a plurality of second audio fingerprint units and second weight units corresponding to the plurality of second audio fingerprint units.

In the foregoing audio retrieval and recognition method, during carrying out the first ranking or the second rank, according to the first weight units and/or the second weight units, the plurality of first audio fingerprint units and/or the plurality of second audio fingerprint units are weighted.

In the foregoing audio retrieval and recognition method, the process of carrying out a first ranking on the plurality of known audio according to each of the plurality of first audio fingerprint units includes: carrying out term frequency-inverse document frequency ranking on the plurality of known audio according to each of the plurality of first audio fingerprint units.

In the foregoing audio retrieval and recognition method, the process of carrying out term frequency-inverse document frequency ranking on the plurality of known audio according to each of the plurality of first audio fingerprint units includes: matching the fingerprint indexes of the plurality of known audio and the plurality of first audio fingerprint units to carry out the term frequency-inverse document frequency ranking on the plurality of known audio.

In the foregoing audio retrieval and recognition method, the process of pre-acquiring fingerprint indexes of the plurality of known audio includes: according to the plurality of second weight units, pre-acquiring a forward index and/or an inverted index of the plurality of known audio.

In the foregoing audio retrieval and recognition method, the process of matching the fingerprint indexes of the plurality of known audio and the plurality of first audio fingerprint units includes: according to the plurality of first weight units, absolutely matching the fingerprint indexes of the audio and the first audio fingerprint units.

In the foregoing audio retrieval and recognition method, the process of carrying out a second ranking on the first candidate audio collection according to the first audio fingerprint units sequentially arranged includes: acquiring a similarity matrix of audio in the first candidate audio collection according to the fingerprint indexes of the plurality of known audio and the first audio fingerprint, and ranking the audio in the first candidate audio collection according to the similarity matrix.

In the foregoing audio retrieval and recognition method, the process of acquiring a similarity matrix of audio in the first candidate audio collection according to the fingerprint indexes of the plurality of known audio and the first audio fingerprint, and ranking the audio in the first candidate audio collection according to the similarity matrix includes: weighting by utilizing the plurality of first weight units and/or the plurality of second weight units to obtain a weighted similarity matrix, ranking the audio in the first candidate audio collection according to the weighted similarity matrix.

In the foregoing audio retrieval and recognition method, the process of ranking the audio in the first candidate audio collection according to the similarity matrix includes: ranking the audio in the first candidate audio collection according to a straight line in the similarity matrix.

In the foregoing audio retrieval and recognition method, the process of acquiring an audio fingerprint of a query audio further includes: acquiring various types of first audio fingerprints of the query audio; the process of pre-acquiring audio fingerprint of the plurality of known audio as second audio fingerprints includes: acquiring various types of second audio fingerprints of audio in the first candidate audio collection; the process of acquiring a similarity matrix of audio in the first candidate audio collection according to the fingerprint indexes of the plurality of known audio and the first audio fingerprint includes: determining the similarity matrix according to the various types of first audio fingerprints and the various types of second audio fingerprints.

In the foregoing audio retrieval and recognition method, each of the various types of first audio fingerprints includes a plurality of first audio fingerprint units; each of the various types of second audio fingerprints includes a plurality of second audio fingerprint units; the process of determining the similarity matrix according to the various types of first audio fingerprints and the various types of second audio fingerprints includes: respectively determining unit similarities between the second audio fingerprint units of an identical type and the plurality of first audio fingerprint units to obtain the unit similarities of various types; and determining the similarity matrix according to a mean value or a minimal value of the various types of unit similarities.

In the foregoing audio retrieval and recognition method, the audio retrieval and recognition method further includes: pre-slicing the query audio and the plurality of known audio according to a preset time span to obtain a plurality of query sub-audio and a plurality of known sub-audio, respectively extracting audio fingerprints from the plurality of query sub-audio and the plurality of known sub-audio to obtain a plurality of first sub-audio fingerprints and a plurality of second sub-audio fingerprints whose lengths are identical.

In the foregoing audio retrieval and recognition method, the audio retrieval and recognition method further includes: before carrying out the first rank, slicing the first audio fingerprints of the obtained query audio and the second audio fingerprints of the plurality of known audio according to a preset length to obtain a plurality of first sub-audio fingerprints and a plurality of second sub-audio fingerprints whose lengths are identical.

In the foregoing audio retrieval and recognition method, the plurality of first audio fingerprint units are arranged in the first audio fingerprint according to a time sequence; the plurality of second audio fingerprint units are arranged in the second audio fingerprint according to the time sequence.

In the foregoing audio retrieval and recognition method, the audio retrieval and recognition method further includes: determining a repetition fragment of audio in query audio and the recognition result according to the similarity matrix.

The objective of the disclosure is achieved by adopting the technical solution as follows. An audio retrieval and recognition device provided by the disclosure includes an audio fingerprint acquirement system, configured for acquiring an audio fingerprint of query audio and a retrieval and recognition system, configured for recognizing the query audio according to the audio fingerprint to obtain a recognition result. The audio fingerprint includes a first part configured for indicating a content feature of the query audio and a second part configured for indicating credibility of the first part.

The objective of the disclosure is achieved by adopting the technical solution as follows.

The foregoing audio retrieval and recognition device further includes a module executing steps in any audio retrieval and recognition method described above.

The objective of the disclosure is achieved by adopting the technical solution as follows. An audio retrieval and recognition hardware device provided by the disclosure includes a memory configured for storing an executable instruction; and a processor configured for executing the computer readable instruction for the computer to implement any audio retrieval and recognition method above.

The objective of the disclosure is achieved by adopting the technical solution as follows. A computer readable storage medium provided by the disclosure configured for storing a non-transitory computer readable instruction; when the non-transitory computer readable instruction is executed by a computer, the computer executes any audio retrieval and recognition method above.

The objective of the disclosure is achieved by adopting the technical solution as follows. A terminal device provided by the disclosure includes any audio retrieval and recognition device above.

The illustration above only is the overview of the technical solution of the disclosure. In order to clearly describe the technological solutions of the disclosure and follow the specification, as well as better understanding the aforementioned and other objectives, features and advantages of the disclosure, preferred embodiments with drawings thereof will be explained in detail as follows.

DETAILED DESCRIPTION

In order to further illustrate technological means adopted by the disclosure for acquiring an expected invention objective and effects, concrete embodiments, structures, features and effects of the audio fingerprint extraction method and device provided according to the disclosure will be illustrated in detail with reference to preferred embodiments and drawings thereof as follows.

Figure 1:
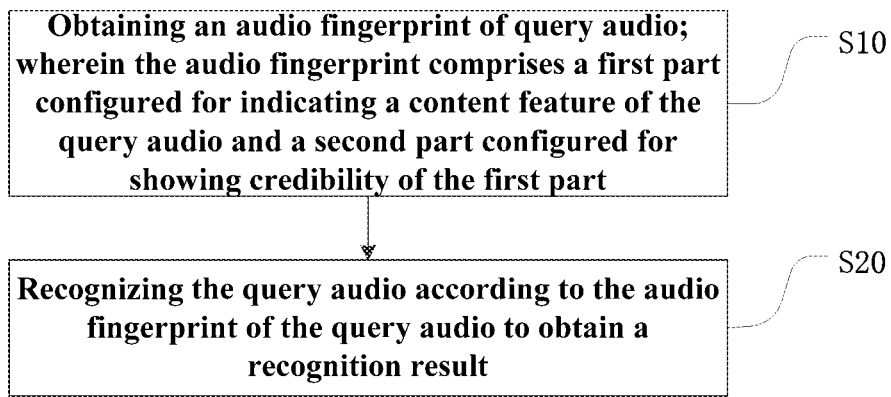
FIG. 1 is a flowchart of an audio retrieval and recognition method of an embodiment of the disclosure.

FIG. 1 is a flowchart of an audio retrieval and recognition method of an embodiment of the disclosure. Referring to FIG. 1, the audio retrieval and recognition method exemplified in the disclosure primarily includes following steps.

Step S10, an audio fingerprint of a query audio is obtained. The audio fingerprint includes a first part configured for indicating a content feature of the query audio and a second part configured for indicating credibility of the first part. Then the process will advance to step S20.

Step S20, the query audio is recognized according to the audio fingerprint of the query audio to obtain a recognition result.

The audio retrieval and recognition method exemplified in the disclosure retrieves and recognize audio by acquiring and utilizing an audio fingerprint feature including the first part configured for indicating the audio content feature and the second part configured for the credibility of the first part of an audio object, which can enhance the accuracy, robustness and efficiency of the audio retrieval and recognition.

Each of the foregoing steps will be respectively stated and illustrated in detail as below.

First, regarding step S10.

Figure 2:
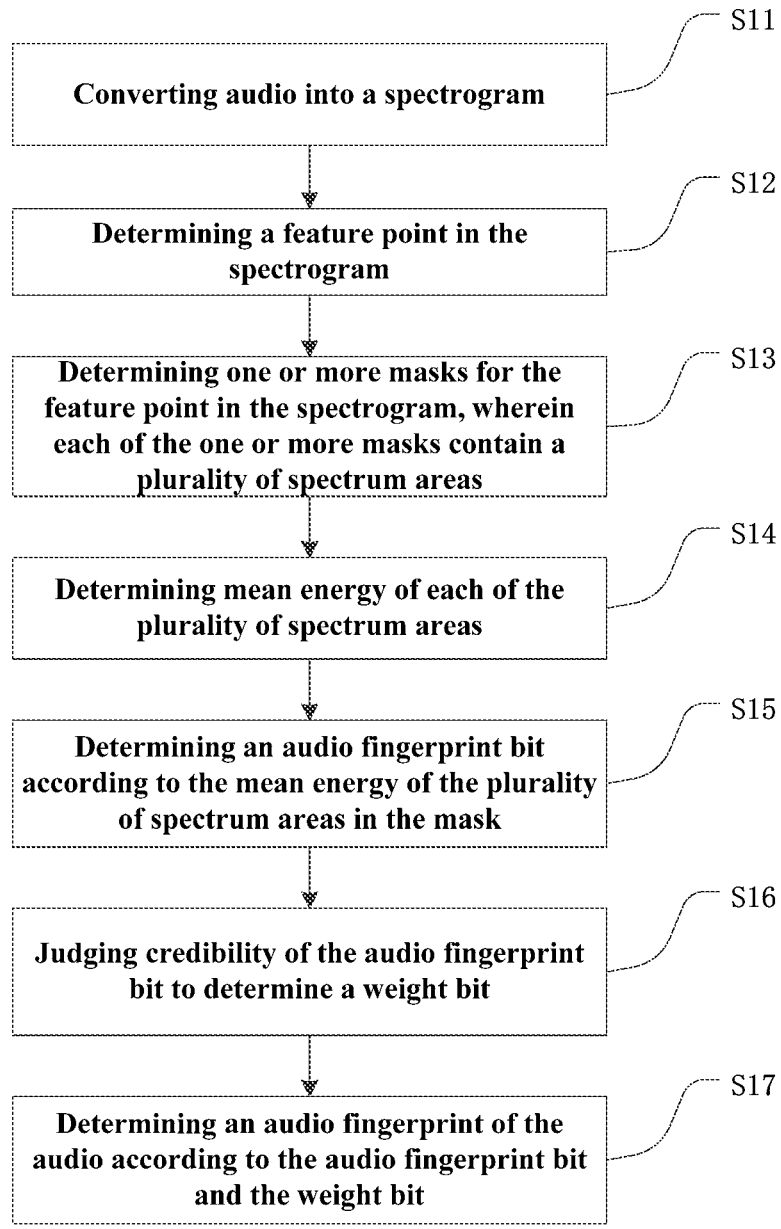
FIG. 2 is a flowchart of acquiring an audio fingerprint provided by an embodiment of the disclosure.

FIG. 2 is a flowchart of acquiring an audio fingerprint provided by an embodiment of the disclosure. As the audio fingerprint can be obtained according to the method as shown in FIG. 2 regardless of any audio, in illustration of the embodiments, the query audio is optional. Referring to FIG. 2, in an embodiment of the disclosure, the specific process of acquiring the audio fingerprint of the foregoing step S10 includes following steps.

Step S11, the audio is converted to the spectrogram. Specifically, an audio signal is converted to a time-frequency spectrogram by the fast Fourier transformation. The spectrogram is a two-dimensional spectrogram of a common audio signal; an abscissa axis is the time t, and a vertical axis is the frequency f. A specific value of each point (t, f) therein indicates the signal energy. It should be noted that concrete types of the audio signal will not be limited, which can be a static file or a streaming audio. Then the process will advance to step S12.

In the embodiment of the disclosure, the spectrogram can be processed by the MEL transformation. The spectrogram can be divided into multiple bins by the MEL transformation, and the amount of divided frequency bins can be deployed. Moreover, the spectrogram can further be processed by the human auditory system filtering, which utilizes nonlinear transformations such as the human auditory system filtering to better fit the spectral distribution in the spectrogram and the ear perception.

It is clarified that different practical situations can be adapted by adjusting each hyper-parameter in the fast Fourier transformation. In embodiments of the disclosure, each of hyper-parameters in step S11 can be disposed as follows. In the fast Fourier transformation, a time window is 100 ms; an interval is 50 ms; in the MEL transformation, the quantity of frequency bins is 32~128.

Step S12, a feature point in the spectrogram is determined.

Specifically, one of various standards is adopted to determine the feature point. For example, a maximum value point of energy in the spectrogram, or a minimum value point of energy can be selected as the feature point. If the energy $E(t,f)$ of one point $(t,f)$ in the spectrogram can simultaneously meet a condition that $E(t,f)$ is greater than $E(t+1,f)$, $E(t,f)$ is greater than $E(t-1,f)$, $E(t,f)$ is greater than $E(t,f+1)$ and $E(t,f)$ is greater than $E(t,f-1)$, the point $(t,f)$ is the maximum value point of energy in the spectrogram, and similarly, if the energy $E(t,f)$ of one point $(t,f)$ in the spectrogram can simultaneously meet a condition that $E(t,f)$ is smaller than $E(t+1,f)$, $E(t,f)$ is smaller than $E(t-1,f)$, $E(t,f)$ is smaller than $E(t,f+1)$ and $E(t,f)$ is smaller than $E(t,f-1)$, the point $(t,f)$ is the minimum value point of energy in the spectrogram. Then the process will advance to step S12.

In the embodiment of the disclosure, since extreme value points of energy are selected as the feature points, the following problems that the extreme value points of energy are liable to be affected by noise, the number of extreme value points is difficult to be controlled, there may be no extreme value points in one spectrogram, but a plurality of extreme value points in another spectrogram to cause uneven feature points, additional timestamps need to be stored to record the positions of the extreme value points of energy in the spectrogram and the like exist. Therefore, the extreme value points of energy may not be selected as the feature points, and instead, fixed points can be selected as the feature points. For example, points (with a fixed frequency) of which the frequency values are equal to a preset frequency set value can be selected. Furthermore, according to preset frequency, set values (the specific values of low frequency, intermediate frequency and high frequency can be set) with multiple types of frequency, including low frequency, intermediate frequency and high frequency can be preset. A plurality of fixed points of which the frequency is low frequency, intermediate frequency and high frequency can be selected as the feature points, so that the selected feature points can be more even. What calls for attention is that the fixed points can be selected according to other standards. For example, points which are equal to one or a plurality of preset energy values can be selected.

What needs to be illustrated is that the amount of the selected feature points can be regulates to adapt to different practical situations. In the embodiment of the disclosure, the hyper-parameter in S12 can be set as follows: the density of the feature points is set to be 20-80/second.

Step S13, one or more masks can be determined for the feature point in the spectrogram near the feature point; each mask contains (or covers) a plurality of spectrogram areas (called spectrum areas). Then, the process enters S14.

Specifically, in the spectrogram, a plurality of spectrum areas contained in each mask can be in symmetrical distribution.

The plurality of spectrum areas are symmetric by a time axis (i.e., the plurality of spectrum areas have the same frequency domain). For example, in one MEL-spectrogram, a mask containing two spectrum areas R11 and R12 can be determined for the feature point, wherein R11 and R12 are both positioned on the left side of the feature point, R11 is positioned on the left of R12, and in addition, R11 and R12 cover the same frequency bin.

Or the plurality of spectrum areas are symmetric by a frequency axis (i.e., the plurality of spectrum areas have the same time horizon). For example, in one MEL-spectrogram, a mask containing two spectrum areas R13 and R14 can be determined for the feature point, wherein R13 is positioned on the upper side of the feature point, R14 is positioned on the lower side of the feature point, and R13 and R14 have the same time horizon.

Or the plurality of spectrum areas are centrosymmetrically distributed by taking the feature point as the center. For example, in one MEL-spectrogram, a mask containing two spectrum areas R15 and R16 can be determined for the feature point. R15 is positioned on the upper left side of the feature point, R16 is positioned on the lower right side of the feature point, and R15 and R16 are mutually symmetric by taking the feature point as the center.

Of course, the plurality of spectrum areas contained in one mask can simultaneously meet various symmetric distribution situations. For example, one mask containing four spectrum areas R21, R22, R23 and R24 can be determined for the feature point. R21, R22, R23 and R24 are independently positioned on the upper left side, the upper right side, the lower left side and the lower right side of the feature point. R21 and R22 have the same frequency domain. R23 and R24 have the same frequency domain. R21 and R23 have the same time horizon. R22 and R24 have the same time horizon, and in addition, the four spectrum areas are centrosymmetric by taking the feature point as the center. What needs to be illustrated is that four spectrum areas of one mask are not necessary to be centrosymmetrically distributed by taking the feature point as the center. For example, the four spectrum areas of one mask can be all positioned on the left side of the feature point and are distributed on two sides of the feature point on the frequency axis.

What needs to be illustrated is that the plurality of spectrum areas belonging to the same mask can be mutually overlapped. In addition, different masks can be mutually overlapped. Optionally, each mask can contain an even number of spectrum areas.

What calls for attention is that the mask can be determined according to a fixed preset standard, i.e., the position and the coverage area of each mask in the spectrogram are preset; or the position and the range of the mask are not fixed in advance, and instead, a data driving way is used for automatically determining a mask area; and the mask with a minimum covariance and highest discrimination is selected from a great quantity of masks.

Step S14, the mean energy of each spectrum area is determined. Specifically, for the spectrum area which only contains one point, the mean energy of the spectrum area is the energy value of the point; and when the spectrum area consists of a plurality of points, the mean energy of the spectrum area can be set as the mean value of the energy values of the plurality of points. Then the process will advance to step S15.

Step S15, an audio fingerprint bit is determined according to the mean energy of the plurality of spectrum areas in the mask; what calls for attention is that the audio fingerprint bit is the first part, used for showing the content features of the audio, in the audio fingerprint. Then the process will advance to step S16.

In the step S15 of the embodiment of the disclosure, one audio fingerprint bit can be determined according to the difference value of the mean energy of the plurality of spectrum areas contained in one mask.

Specifically, if one mask contains two spectrum areas, for example, the above example containing two spectrum areas R11 and R12 can calculate a difference value D1 of the mean energy of R11 and R12 according to the following first formula:

$$D1=E(R11)-E(R12), \quad \text{(first formula)}$$

Then the difference value D1 is positive or negative can be judged; an audio fingerprint bit of which the value is 1 can be obtained if the difference value D1 is a positive value, and if the difference value 1 is a negative value, an audio fingerprint bit of which the value is 0 can be obtained.

If one mask contains four spectrum areas, for example, the above example containing four spectrum areas, R21, R22, R23 and R24 can calculate a difference value D2 of the mean energy of R21, R22, R23 and R24 according to the following second formula:

$$D2=(E(R21)+E(R22))-(E(R23)+E(R24)), \quad \text{(second formula)}$$

Then the difference value D2 is positive or negative can be judged, an audio fingerprint bit of which the value is 1 can be obtained if the difference value D2 is positive value, and if the difference value D2 is a negative value, an audio fingerprint bit of which the value is 0 can be obtained. What needs to be illustrated is that the audio fingerprint bit of the mask containing four spectrum areas does not have to be determined through the difference value D2, and instead, the audio fingerprint bit can be determined by difference values of other forms. For example, the second-order difference value D3 of the mean energy of the four spectrum areas can be calculated.

$$D3=(E(R23)-E(R24))-(E(R21)-E(R22)), \quad \text{(third formula)}$$

Then the difference value D1 is positive or negative can be judged to determine the audio fingerprint bit.

What needs to be illustrated is that a plurality of audio fingerprint bits can be correspondingly obtained if a plurality of masks are determined for the feature point.

Step S16, a weight bit corresponding to the audio fingerprint bit is determined; the weight bit is used for showing the credibility of the audio fingerprint bit. What calls for attention is that the weight bit is the second part used for showing the credibility of the first part in the above audio fingerprint. Specifically, the audio fingerprint bit with the high credibility is defined as a strong bit, and the audio fingerprint with low credibility is defined as a weak bit. The credibility of one audio fingerprint bit is judged, and according to whether the audio fingerprint bit is a strong bit or a weak bit, the value of the weight bit can be determined. Then the process will advance to step S17.

In the embodiment of the disclosure, if the audio fingerprint bit is determined by the difference value of the mean energy of the plurality of spectrum areas contained in one mask, the step S16 can specifically include the following steps: judging whether the absolute value of the difference value used for generating the audio fingerprint bit achieves (or exceeds) a preset bit threshold value or not; if the absolute value achieves the preset bit threshold value, determining the audio fingerprint bit as a strong bit, and acquiring a weight bit which corresponds to the audio fingerprint bit; the value of the weight bit is 1; and if the absolute value does not achieve the preset bit threshold value, determining the audio fingerprint bit as a weak bit, and acquiring a weight bit which corresponds to the audio fingerprint bit; the value of the weight bit is 0.

As a specific example, if one audio fingerprint bit is determined by judging the difference value D2 of the mean energy of four spectrum areas in the above second formula is positive or negative, the step S16 includes the following steps: judging a relationship of the absolute value of the difference value D2 and a preset bit threshold value T; if the absolute value of the difference value D2 is greater than or equal to T, proving that the audio fingerprint bit is the strong bit, and setting the value of the weight bit corresponding to the audio fingerprint bit as 1; and if the absolute value of the difference value D2 is small than T, proving that the audio fingerprint bit is the weak bit, and setting the value of the weight bit corresponding to the audio fingerprint bit as 0. What needs to be illustrated is that the bit threshold value can be various types of threshold values: the bit threshold value can be a preset fixed value, such as a fixed value 1; or the bit threshold value can be a numerical value obtained based on the difference value of the mean energy, for example, the bit threshold value can be set as a mean value (which in fact is not restricted to the mean value and can be any one numerical value between a maximum difference value and a minimum difference value) of a plurality of difference values corresponding to multiple masks (or multiple feature points); in addition, the audio fingerprint bit of which the difference value achieves the mean value is taken as the strong bit, and the audio fingerprint bit of which the difference value does not achieve the mean value is taken as the weak bit; or the bit threshold value can be a scale value; for example, the bit threshold value can be set as 60%; if the absolute value of one difference value is positioned in the top 60% of all difference values in a plurality of difference values corresponding to the multiple masks (or multiple feature points), the audio fingerprint bit can be determined as the strong bit, otherwise the audio fingerprint bit is determined as the weak bit.

Step S17, the audio fingerprint of the audio is determined according to the audio fingerprint bit and the weight bit. Specifically, the combination way and the length of the audio fingerprint are not restricted; the audio fingerprint only needs to contain each audio fingerprint bit (used for forming the first part of the audio fingerprint) and each weight bit (used for forming the second part of the audio fingerprint) corresponding to one or more feature points. In some embodiments of the disclosure, the audio fingerprint includes a plurality of audio fingerprint units and weight units corresponding to the audio fingerprint units; each audio fingerprint unit includes a plurality of audio fingerprint bits of the audio, and each weight unit includes a plurality of weight bits corresponding to the plurality of audio fingerprint bits. For example, the audio fingerprint bits corresponding to all masks of one feature point can be combined to obtain an audio fingerprint bit sequence as the audio fingerprint unit; the corresponding weight bits are combined to obtain a weight bit sequence which has the equal length with the audio fingerprint bit sequence to serve as the weight unit; the audio fingerprint units and the weight units corresponding to the feature points are arranged according to the time sequence of the feature points to form the audio fingerprint. Optionally, the length of the obtained audio fingerprint unit can be 32 bits.

While the disclosure extracts the audio fingerprint bit, the weight bit corresponding to the audio fingerprint bit is extracted, and the audio fingerprint with high accuracy and good robustness can be generated for one segment of audio.

Optionally, the step S10 disclosed by the disclosure also includes the following steps: adding a timestamp field to the audio fingerprint for showing a time difference of an audio starting position and the feature point; the field can be a hash value. If the feature point is set as a fixed point, the step does not need to be contained, i.e., the timestamp does not need to be recorded.

Optionally, the step S10 disclosed by the disclosure also includes the following steps: adding an audio identification field to the audio fingerprint for recording the ID information of the audio corresponding to the audio fingerprint; the field can be a hash value.

Optionally, the step S10 disclosed by the disclosure also includes the following steps: dividing an original audio into multiple pieces of sub-audio according to time; according to the steps of the above method, extracting the audio fingerprint from each piece of sub-audio to obtain a plurality of audio fingerprints; and combining the extracted audio fingerprints of all pieces of sub-audio to obtain the audio fingerprint of the whole piece of audio.

Second, regarding step S20.

In order to be convenient for narration and understanding, the audio fingerprint of the query audio can be called a first audio fingerprint; the audio fingerprint unit contained in the first audio fingerprint is called a first audio fingerprint unit, and a weight unit corresponding to the first audio fingerprint unit can be called a first weight unit.

Figure 3:
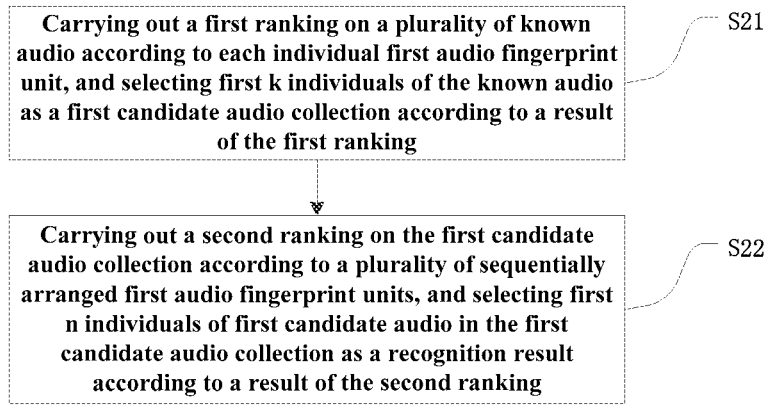
FIG. 3 is a flowchart of retrieving and recognizing audio provided by an embodiment of the disclosure.

FIG. 3 is a schematic flowchart of retrieving and recognizing the audio according to the audio fingerprint provided by an embodiment of the disclosure. Referring to FIG. 3, in one embodiment of the disclosure, the process of above step S20 of retrieving and recognizing the query audio specifically includes the following steps.

Step S21, a first ranking is carried out on a plurality of pieces of known audio according to the first audio fingerprint, and the first k pieces of known audio are taken out as a first candidate audio collection according to the result of the first rank; k is a positive integer, and the specific value of k can be set. Specifically, the first ranking is carried out according to the matching situation of each individual first audio fingerprint unit and the known audio, and furthermore, the first ranking can be the term frequency-inverse document frequency (TF-IDF) ranking carried out on the known audio according to each audio fingerprint unit. Then the process will advance to step S22.

Step S22, second ranking is carried out on the first candidate audio collection according to the first audio fingerprint, and the first n pieces of first candidate audio in the first candidate audio collection are taken out as a recognition result according to the result of second ranking; n is a positive integer, and the specific value of n can be set. Specifically, the second ranking is carried out on audio in the first candidate audio collection according to a plurality of first audio fingerprint units arranged in sequence. For example, the plurality of first audio fingerprint units include one continuous part in the first audio fingerprint and the whole first audio fingerprint, and/or the plurality of first audio fingerprint units arranged in sequence include a plurality of first audio fingerprint units of which the serial numbers have the same interval in the first audio fingerprint, such as the plurality of first audio fingerprint units of which the serial numbers are 1, 3, 5, 7, etc. . . .

Therefore, according to the recognition result, retrieval is carried out in a Meta database, the audio information, such as the name, the author, the provenance and the like of the recognized audio, of the recognition result can be obtained. When the recognition result includes the plurality of pieces of audio, the information of the plurality pieces of recognized audio can be simultaneously provided.

In the embodiment of the disclosure, in a process of carrying out the first ranking of S21 and/or the second ranking of S22, when the audio fingerprint is used, according to the weight unit in the audio fingerprint, weighting is carried out on the audio fingerprint unit. Since an unweighted first ranking and second ranking process is equivalent to a process that same weight is applied to each audio fingerprint unit during ranking, only the first ranking and second ranking process which utilizes the weight to carry out weighting on the audio fingerprint is specifically illustrated.

A media retrieval method which is provided by the disclosure obtains a retrieval result through first ranking and second ranking, and therefore, the media retrieval accuracy and efficiency can be greatly improved.

Regarding above step S21

The above known audio can be the audio in the audio database. The audio database stores the audio fingerprint of the known audio; in addition, the stored audio fingerprint of the known audio contains the audio fingerprint which is obtained by the same extraction method with the first audio fingerprint and has the same type with the first audio fingerprint, and therefore, the audio fingerprint of the known audio also includes the first part used for showing the content feature of the audio, and the second part used for showing the credibility of the first part.

In some embodiments of the disclosure, the audio retrieval and recognition method of the disclosure also includes the following steps: acquiring a plurality of audio fingerprints of the known audio in advance; the audio fingerprints of the known audio can be called the second audio fingerprint in order to be convenient for narration and understanding, and the audio fingerprint units contained in the second audio fingerprint are called second audio fingerprint units, and the weight units contained in the second audio fingerprint are called second weight units; carrying out indexing on the second audio fingerprints to obtain the fingerprint index of the known audio; matching the fingerprint index with the first audio fingerprint unit of the query audio so as to carry out TF-IDF ranking.

Specifically, the above step of pre-acquiring the fingerprint index of the known audio further includes the forward index and the inverted index of the pre-obtained audio fingerprint of the known audio so as to conveniently carry out retrieval and comparison on the audio fingerprint; the forward index and the inverted index can be pre-stored in the audio database; the forward index is used for recording the audio fingerprint of each piece of known audio, i.e., audio fingerprint units specifically contained in the audio fingerprint of each piece of known audio are recorded, and the sequence of the audio fingerprint units is also recorded; and the inverted index is used for recording the audio fingerprints, in which audio fingerprint units appear, of certain one or more pieces of known audio. Specifically, the form of a key-value pair is used for storing the forward index and the inverted index: in the forward index, one key is used for showing the number (or called audio ID) of one individual of audio; a value corresponding to the key records audio fingerprint units contained in the audio and also records the sequence of the audio fingerprint units; the key and the value in the forward index are independently called a forward key and a forward value; and in the inverted index, one key is used for showing one audio fingerprint unit; a value corresponding to the key records the number of the audio which contains the audio fingerprint unit; the key and the value in the inverted index are independently called an inverted key and an inverted value.

What calls for attention is that indexing can be carried out on the second audio fingerprint according to the weight to improve robustness. Specifically, in a process of determining the forward index, the weight unit corresponding to each audio fingerprint unit of the known audio can be recorded in the forward index. In a process of determining the inverted index, when whether one audio fingerprint unit to be indexed appears in one individual of known audio or not is determined, the weak bit in the audio fingerprint unit to be indexed can be ignored, and only whether all strong bits in the audio fingerprint unit to be indexed are consistent with the corresponding bit of certain audio fingerprint unit in the known audio or not is judged. For example, if the first audio fingerprint bit and the third audio fingerprint bit in one audio fingerprint unit to be indexed are strong bits and other audio fingerprint bits are weak bits, the inverted index of the audio fingerprint unit to be indexed records the known audio number of the audio fingerprint unit which has the same first audio fingerprint bit and third audio fingerprint bit with the audio fingerprint unit to be indexed.

TF-IDF ranking is one category of technology that judges the degree of importance of the information by carrying out term frequency and inverse document frequency weighting on the information so as to carry out ranking; the term frequency means the occurrence frequency of one term (or one individual of information) in certain article (or certain document), and the term frequency and the degree of importance of the term for the article are in a direct proportion; the document frequency means how many articles in an article library the work appears; the inverse document frequency is the reciprocal (during practical calculation, a logarithm can be taken from the inverse document frequency, or the inverse document frequency is defined as the logarithm of the reciprocal of the document frequency) of the document frequency, and the inverse document frequency and the discrimination degree of the term are in a direct proportion. Therefore, TF-IDF ranking carries out the ranking by the product of the term frequency and the inverse document frequency. In fact, the audio fingerprint of one individual of audio can be taken as an article, and each audio fingerprint unit is taken as one term to carry out ranking on the known audio by the TF-IDF way.

In addition, if all pieces of known audio in the audio database are subjected to first ranking, retrieval and recognition efficiency may be affected; the known audio in the audio database can be subjected to exact match before the first ranking; the exact match is used for selecting the known audio of which the amount of contained first audio fingerprint units is above a preset amount or a preset proportion as a second candidate audio collection; and then, the second candidate audio collection is subjected to the first ranking so as to select a first candidate audio collection.

Figure 4:
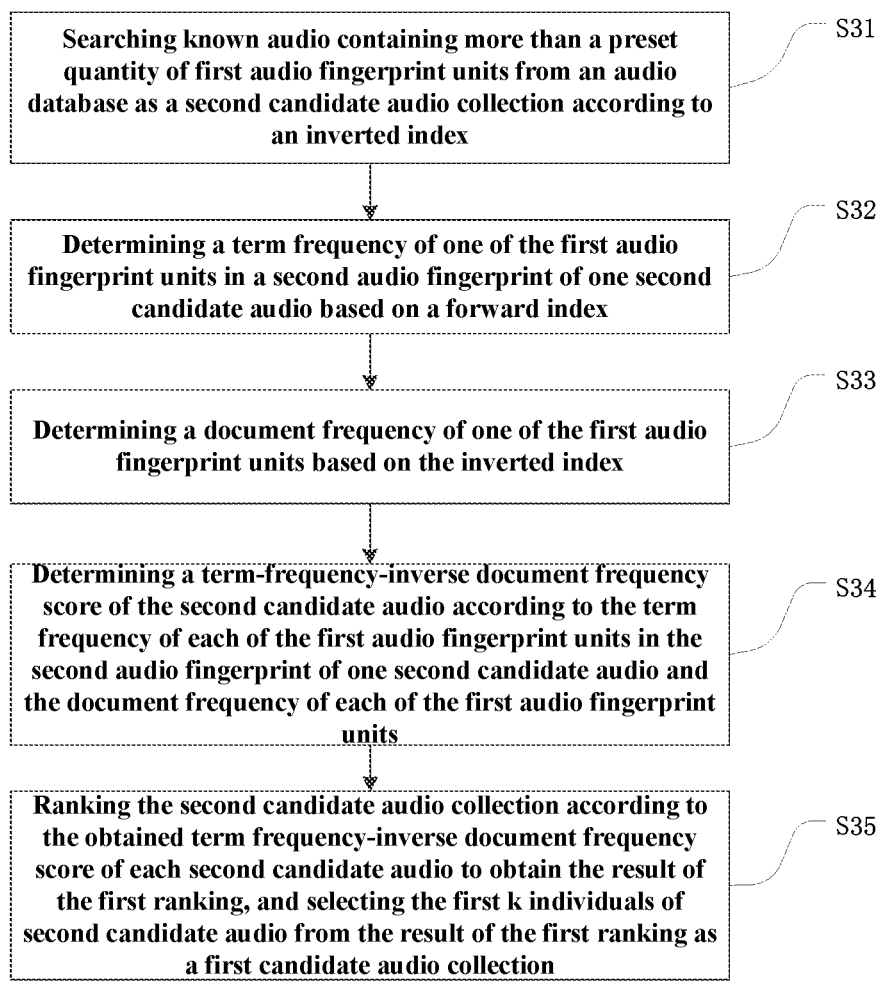
FIG. 4 is a flowchart of a first ranking provided by an embodiment of the disclosure.

FIG. 4 is a schematic flowchart of first ranking according to one embodiment of the disclosure. Referring to FIG. 4, in one embodiment of the disclosure, the first ranking specifically includes the following steps.

Step S31, according to the inverted index, statistics are carried out on the second audio fingerprints, in which first audio fingerprint units appear, of the known audio so as to match the known audio which contains more than a preset quantity of first audio fingerprint units from the audio database as a second candidate audio collection. What calls for attention is that the match situation of the strong bit in the first audio fingerprint unit in the second audio fingerprint of the known audio only needs to be judged according to the weight unit corresponding to one first audio fingerprint unit, and the match situation of the weak bit in the first audio fingerprint unit needs to be ignored to improve robustness. Then the process will advance to step S32.

What calls for attention is that the "quantity" in the "more than a preset quantity of first audio fingerprint units" means the category of the first audio fingerprint units. Specifically, the preset quantity can be one, and therefore, the matched second candidate audio collection is the known audio in which certain one type of first audio fingerprint unit appears in the second audio fingerprint; the preset quality can be multiple, and might as well be p (which is a positive integer), and therefore, the matched second candidate audio collection is the known audio in which at least p types of first audio fingerprint units appear in the second audio fingerprint.

Step S32, the term frequency of one first audio fingerprint unit in the second audio frequency fingerprint of the second candidate audio is determined based on the forward index; the term frequency is a proportion of one first audio fingerprint unit to all audio fingerprint units contained in one second audio fingerprint. What calls for attention is that the forward index can be the above index obtained according to the weight. Then the process will advance to step S33.

Step S33, the document frequency of one first audio fingerprint unit is determined based on the inverted index; the document frequency is a proportion of the quantity of the known audio containing the first audio fingerprint units to the total quantity of the known audio in the second audio fingerprint in a plurality of pieces of known audio (such as all pieces of known audio in the audio database). What calls for attention is that the inverted index can be the above index obtained according to the weight. Then the process will advance to step S34.

Step S34, the term-frequency-inverse document frequency score of the second candidate audio is determined according to the term frequency of each first audio fingerprint unit in the second audio fingerprint of one individual of second candidate audio as well as the document frequency of each first audio fingerprint unit. Then the process will advance to step S35.

Step S35, the second candidate audio collection is ranked according to the obtained term frequency-inverse document frequency score of each second candidate audio to obtain the result of the first rank, and the first k pieces of second candidate audio are taken out from the result of the first ranking as a first candidate audio collection; meanwhile, the second audio fingerprint (forward index) of each first candidate audio is returned for further processing the first candidate audio collection based on the second audio fingerprint in subsequent second ranking.

In the embodiment, an index server can be used for taking the first audio fingerprint unit of the query audio as an index request; exact match and TF-IDF ranking are carried out according to the above forward index and inverted index so as to recall the first candidate audio collection, and meanwhile, the obtained forward index of each piece of first candidate audio can be returned. Specifically, an open source Elasticsearch search engine can be used for carrying out all above steps to achieve a quick retrieval effect.

What calls for attention is that the exact match and the first ranking pay more attention to which known audio the first audio fingerprint units appear in and pay more attention to the own retrieval situation of the first audio fingerprint units; the influence of the sequence of first single fingerprints in the first audio fingerprint on the retrieval is not considered, or the retrieval situation of whole or a plurality of continuous audio fingerprint units is not considered.

The audio retrieval and recognition method which is provided by the disclosure carries out exact match and the first ranking based on the TF-IDF way according to the audio fingerprint containing the weight, and therefore, the audio retrieval and recognition accuracy and efficiency can be greatly improved.

Regarding above step S22

In some embodiment of the disclosure, the second ranking is ranking for the audio in the first candidate audio collection according to the occurrence situation of a sequence which is formed by a plurality of first audio fingerprint units arranged in sequence and has a sequential order in the audio fingerprint of the first candidate audio. Specifically, the second ranking includes the following steps: according to the fingerprint index of the known audio and the first audio fingerprint, acquiring the similarity matrix of the audio in the first candidate audio collection, and according to the similarity matrix, carrying out ranking on the audio in the first candidate audio collection. What calls for attention is that the weight corresponding to the first audio fingerprint and/or the weight in the fingerprint index of the known audio; weighting is carried out, and the weighted similarity matrix is used for carrying out ranking on the audio in the first candidate audio collection to improve robustness.

Figure 5:
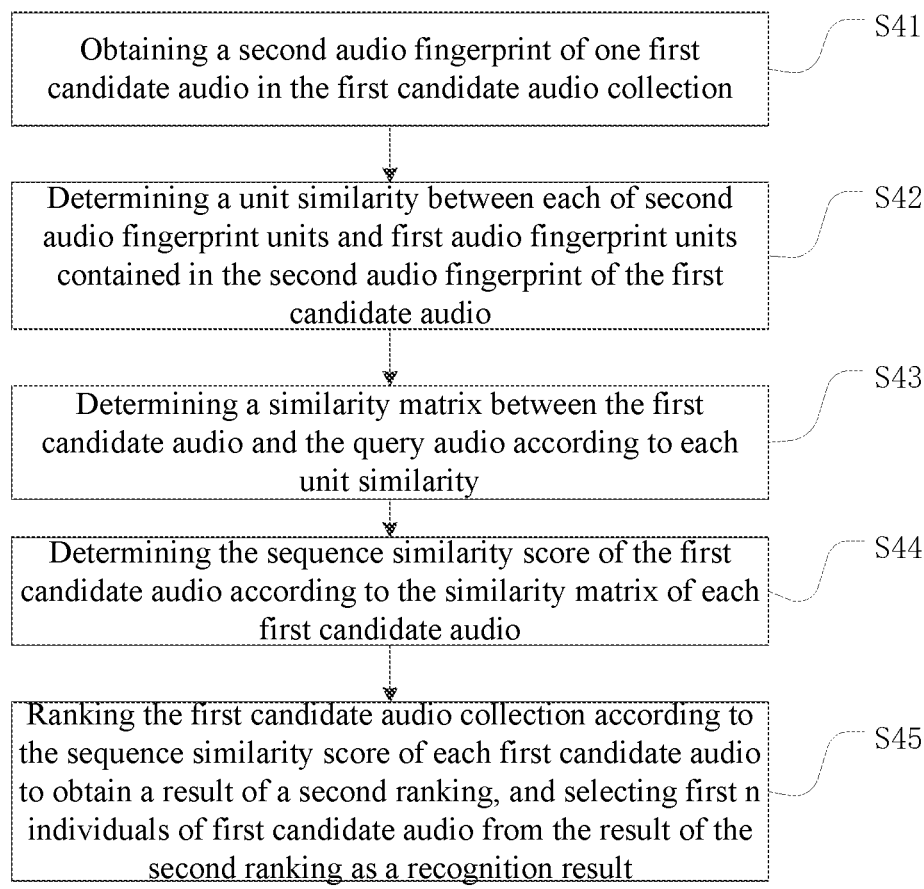
FIG. 5 is a flowchart of a second ranking provided by an embodiment of the disclosure.

FIG. 5 is a schematic flowchart of second ranking according to one embodiment of the disclosure. Referring to FIG. 5, in one embodiment of the disclosure, the second ranking specifically includes the following steps.

Step S41, the second audio fingerprint of one first candidate audio (in fact, each piece of first candidate audio is the known audio) in the first candidate audio collection is obtained. Specifically, according to the fingerprint index (such as forward index) of the known audio, the second audio fingerprint can be obtained. The first audio fingerprint of the query audio is assumed to contain M1 pieces of first audio fingerprint units, and the second audio fingerprint of the first candidate audio contains M2 pieces of second audio fingerprint units; M1 and M2 are both positive integers. In certain examples in the disclosure, the first audio fingerprint includes the weight unit (which may as well be called a first weight unit) corresponding to each first audio fingerprint unit, and/or the second audio fingerprint includes the weight unit (which may as well be called a second weight unit) corresponding to each second audio fingerprint unit. Then the process will advance to step S42.

Step S42, unit similarities between second audio fingerprint units contained in the second audio fingerprint of the first candidate audio and first audio fingerprint units are determined, thus acquiring M1*M2 pieces of unit similarities; each single similarity shows a similarity degree between one first audio fingerprint unit and one second audio fingerprint unit. Specifically, the single similarity is in direct proportion to similarity, and what calls for attention is that each audio fingerprint unit and each second audio fingerprint unit are weighted according to the first weight unit and/or second single weight in a single similarity determining process; then, the single similarity is determined according to the weighted first audio fingerprint unit and second audio fingerprint unit, and in one example of the disclosure, since the accuracy of data information in the audio database is higher, the second weight unit can be used for independently carrying out weighting on the first audio fingerprint unit and the second audio fingerprint unit. Then the process will advance to step S43.

In the embodiment of the disclosure, according to the type of the audio fingerprint, a distance or a metric capable of judging the similarity degree between two audio fingerprint units is selected to serve as the single similarity. Specifically, when the first audio fingerprint unit and the second audio fingerprint unit are both binary fingerprints obtained according to the methods of S11 to S17 in the above embodiments, a Hamming distance between the first audio fingerprint unit and the second audio fingerprint unit is calculated; then, a difference value of the length (bit number) of the audio fingerprint unit and the Hamming distance is calculated, and a ratio of the difference value to the length of the audio fingerprint unit is determined as the single similarity for showing the proportion of the same bit in the two binary fingerprints; the Hamming distance is a common metric in the information theory field, and the Hamming distance between two equal-length character strings is the number of different characters on the corresponding positions of two character strings. In practical Hamming distance calculation, two character strings can be subjected to the exclusive OR operation, the number of two character strings of which the result is 1 can be subjected to statistics, and the number is the Hamming distance. What needs to be illustrated is that the audio fingerprint units obtained by the same method have the same length. The specific method disclosed by the disclosure for carrying out weighting on the single similarity of the Hamming distance type through the weight lies in that the weight bit in the weight unit is firstly used for carrying out weighting on the corresponding audio fingerprint bit in the audio fingerprint units; then, the first audio fingerprint unit and the second audio fingerprint unit are subjected to the exclusive OR operation to obtain the single similarity weighted by the weight. In addition, what needs to be illustrated is that the single similarity is not only shown by the Hamming distance, any distance or metric which can judge the similarity degree between two audio fingerprint units can be used.

Step S43, a similarity matrix between the first candidate audio and the query audio is determined according to the single similarity.

Specifically, each point in the similarity matrix corresponds to one single similarity; the similarity matrix records the unit similarities between second audio fingerprint units of one individual of first candidate audio and first audio fingerprint units. In addition, points of the similarity matrix are arranged in a horizontal direction according to the sequence of first audio fingerprint units of the query audio in the first audio fingerprint, and are arranged in a longitudinal direction according to the sequence of second audio fingerprint units of the first candidate audio in the second audio fingerprint. Therefore, the point which is positioned in the $i^{th}$ line and the $j^{th}$ row shows the single similarity between the $i^{th}$ first audio fingerprint unit of the query audio and the $j^{th}$ second audio fingerprint unit of the first candidate audio, and therefore, the similarity matrix is an M1*M2 matrix. Then the process will advance to step S44.

What needs to be illustrated is that a situation that unit/single similarities are firstly calculated in S42 and the similarity matrix is then determined in S43 is not necessary in a practical operation; instead the similarity matrix can be directly determined, and the corresponding single similarity is calculated in a process of determining each point of the similarity matrix.

S44, the sequence similarity score of the first candidate audio is determined according to the similarity matrix of each piece of first candidate audio; the sequence similarity score is used for showing the similarity degree between the first candidate audio and the query audio and can be a score between 0 and 1, and figures are in a direct proportion to two pieces of audio. Then the process will advance to step S45.

Specifically, the sequence similarity score is determined according to a straight line in the similarity matrix.

What calls for attention is that the similarity matrix is a finite matrix since the audio fingerprint generally contains a plurality of finite audio fingerprint units; in fact, the so-called "straight line" is a finite-length line segment formed by a plurality of points in the similarity matrix. The straight line has a slope, and the slope is a slope of a connection line of the plurality of points contained in the straight line. In addition, the starting point and the end point of the straight line can be any point in the similarity matrix and needless to be a point positioned on an edge.

The straight line disclosed by the disclosure includes a diagonal in the similarity matrix, and a straight line which is in parallel with the diagonal; the slope of each line segment of the straight line from upper left to lower right is 1 in the similarity matrix. The straight line also includes straight lines of which the slope is not 1. For example, the straight line can be a straight line of which the slope is almost 1 to improve audio retrieval and recognition robustness; the straight line can be straight lines of which the slopes are 2, 3, . . . or ½, ⅓, . . . and the like to cope with the retrieval and recognition of the audio subjected to speed regulation; and the straight line even can be straight lines (which are from lower left to right upper in the similarity matrix) of which the slope is a negative number to cope with the retrieval and recognition of the audio subjected to backward playing processing; the diagonal is a line segment (which is a straight line which takes a point on an upper left corner as a starting point and has the slope of 1 in fact) formed by points positioned on (1,1), (2,2), (3,3) . . . .

In fact, each straight line in the similarity matrix consists of a plurality of unit similarities arranged in sequence; each straight line shows the similar situation of a plurality of audio fingerprint unit pairs arranged in sequence, so that the similarity between one audio clip in the query audio and one audio clip in the known audio can be shown; each audio fingerprint unit pair includes a first audio fingerprint unit and a second audio fingerprint unit (in other words, each straight line shows the similarity degree between a plurality of first audio fingerprint units arranged in sequence and a plurality of second audio fingerprint units arranged in sequence), and the slope, the starting point and the end point of the straight line show the length and the position of two audio clips. For example, since a straight line formed by (1,1), (2,3), (3,5) and (4,7) shows a similar situation between the first audio fingerprint unit of which the ordinal number is 1 and the second audio fingerprint unit of which the ordinal number is 1, a similar situation between the first audio fingerprint unit of which the ordinal number is 2 and the second audio fingerprint unit of which the ordinal number is 3 and the like; the straight line can reflect a similar situation between one query audio clip corresponding to the first audio fingerprint units of which the ordinal numbers are 1, 2, 3 and 4 and one known audio clip corresponding to the second audio fingerprint units of which the ordinal numbers are 1, 3, 5 and 7.

Therefore, according to the straight line in the similarity matrix, the similar situation between one individual of first candidate audio and the query audio is determined as follows: the average situation (or overall situation) of unit similarities contained in one straight line is defined as the straight line similarity of the straight line; the straight line similarity can embody a similar situation between a plurality of corresponding first audio fingerprint units and a plurality of corresponding second audio fingerprint units; a straight line with the highest straight line similarity is determined in the similarity matrix and is called a matched straight line; and the straight line similarity of the matched straight line is determined as the sequence similarity score of the first candidate audio.

What calls for attention is that one straight line with the highest straight line similarity can be determined from a plurality of preset straight lines in a matched straight line determining process; for example, a plurality of preset straight lines are all straight lines of which the slopes are a preset slope set value (for example, the slope is 1), or a plurality of points which enable the unit similarities to be ranked top can be selected from the similarity matrix, and a straight line is fitted according to the points so as to generate a straight line which enables the straight line similarity to be relatively highest.

Step S45, the first candidate audio collection is ranked according to the sequence similarity score of each piece of first candidate audio to obtain a result of the second rank, and the first n pieces of first candidate audio are taken out from the result of the second ranking as a recognition result.

The audio retrieval and recognition method which is provided by the disclosure carries out second ranking according to the audio fingerprint containing the weight based on the similarity matrix, and can greatly improve the accuracy and the efficiency of audio retrieval and recognition.

Figure 6:
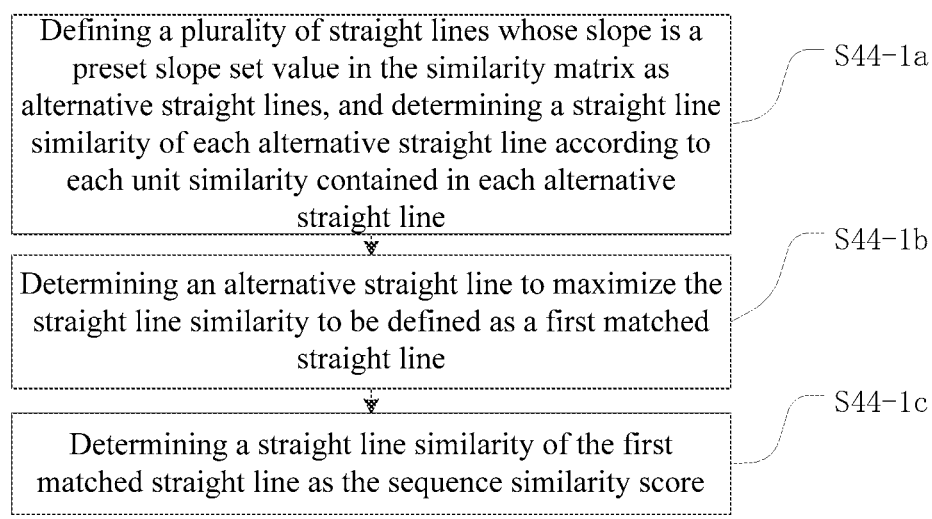
FIG. 6 is a flowchart of determining a sequence similarity score by the dynamic programming method provided by an embodiment of the disclosure.

In one specific embodiment of the disclosure, a dynamic planning method can be used for determining the sequence similarity score according to the similarity matrix. FIG. 6 is a schematic flowchart of carrying out audio retrieval and recognition by a dynamic planning method provided by the embodiment of the disclosure. Referring to FIG. 6, in one embodiment, the step S44 includes the following specific steps.

Step S44-1*a*, a plurality of straight lines of which the slopes are a preset slope set value in the similarity matrix are defined as alternative straight lines, and the straight-line similarity of each alternative straight line is determined according to unit similarities contained in each alternative straight line. Specifically, the straight-line similarity of one straight line can be set as the mean value of unit similarities contained in the straight line, or can be set as the sum value of unit similarities contained in the straight line. In one specific example, the slope set value can be taken as 1, i.e., the above alterative straight lines are a diagonal in the similarity matrix and the straight line in parallel with the diagonal. Then the process will advance to step S44-1*b*.

What calls for attention is that in one embodiment of the disclosure, the step S44-1*a* also includes the following steps: firstly, eliminating straight lines in which the amount of contained unit similarities is smaller than a preset straight line set value from the alternative straight lines, and then the process will advance to step S44-1*b*. Or, in the embodiment, the alternative straight lines also need to meet a condition that the amount of contained unit similarities achieves the preset straight-line set value. The straight lines of which the single similarity is extremely small are eliminated, so that the problem that the accuracy of the sequence similarity score which is finally obtained is affected since the single similarity contained in the straight line is extremely small can be avoided.

Step S44-1*b*, an alternative straight line which enables the straight-line similarity to be highest is determined from a plurality of alterative straight lines, and defined as a first matched straight line. Then the process will advance to step S44-1c.

Step S44-1c, the straight-line similarity of the first matched straight line is determined as the sequence similarity score.

What calls for attention is that in certain embodiments of the disclosure, preset slope set values in S44-1a can be various, i.e., the alternative straight lines are straight lines of which the slope is equal to any one of the plurality of slope set values. For example, the alternative straight lines can be a straight line of which the slope is 1, −1, 2, ½ and the like. In addition, in S44-1b, one first matched straight line is determined from multiple alternative straight lines of which the slope is any one of the plurality of slope set values.

The audio retrieval and recognition method which is provided by the disclosure determines the sequence similarity score by a dynamic planning method, and therefore, the accuracy and the efficiency of audio retrieval and recognition can be improved.

Figure 7:
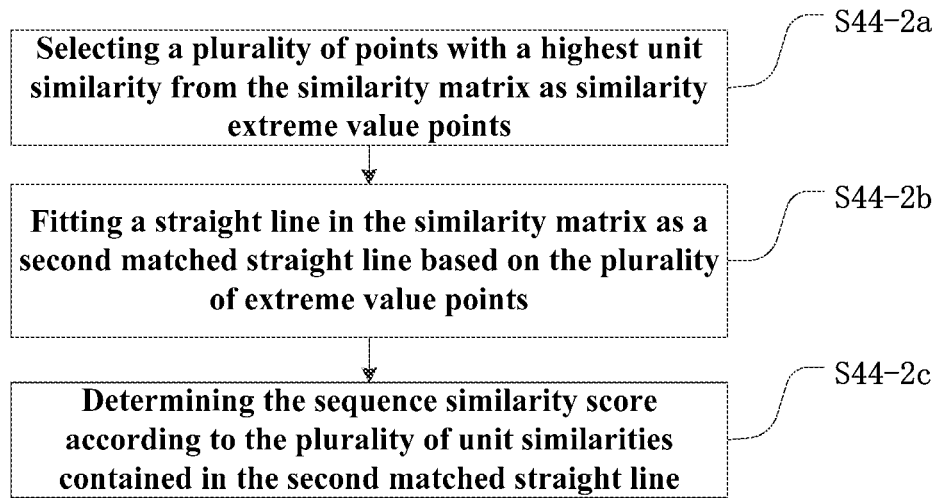
FIG. 7 is a flowchart of determining a sequence similarity score by a constant speed audio method provided by an embodiment of the disclosure.

In another specific embodiment of the disclosure, a constant speed media method can be used for determining the sequence similarity score according to the similarity matrix. FIG. 7 is a schematic flowchart of carrying out audio retrieval and recognition by a constant speed media method provided by one embodiment of the disclosure. Referring to FIG. 7, in one embodiment, the step S34 includes the following specific steps.

Step S44-2a, a plurality of points with a highest single similarity are selected from the similarity matrix as similarity extreme value points; the specific amount of the similarity extreme value points can be preset. Then the process will advance to step S44-2b.

Step S44-2b, a straight line is fitted in the similarity matrix as a second matched straight line based on the plurality of extreme value points. In certain specific examples, a straight line which has a preset slope set value or is close to the preset slope set value is fitted as a second matched straight line based on the plurality of extreme value points. For example, a straight line of which the slope is close to 1 is fitted. Specifically, by use of a random sample consensus method (RANSAC method for short), a straight line of which the slope is close to the slope set value is fitted in the similarity matrix; the RANSAC method is a common method capable of calculating the mathematic model parameter of data according to one group of sample datasets containing exceptional data to obtain effective sample data. Then the process will advance to step S44-2c.

Step S44-2c, the sequence similarity score is determined according to the plurality of unit similarities contained in the second matched straight line. Specifically, the mean value of t unit similarities on the second matched straight line is determined as the sequence similarity score.

The audio retrieval and recognition method which is provided by the disclosure determines the sequence similarity score by the constant speed media method, and therefore, the accuracy and the efficiency of audio retrieval and recognition can be improved.

Furthermore, the similarity matrix can be obtained by comprehensively considering various audio similarities. Specifically, the audio retrieval and recognition method disclosed by the disclosure also includes the following steps: acquiring various types of first audio fingerprints of the query audio, acquiring various types of second audio fingerprints of the audio in the first candidate audio collection, and determining the similarity matrix according to the fingerprint indexes obtained based on various types of second audio fingerprints and various types of first audio fingerprints.

Figure 8:
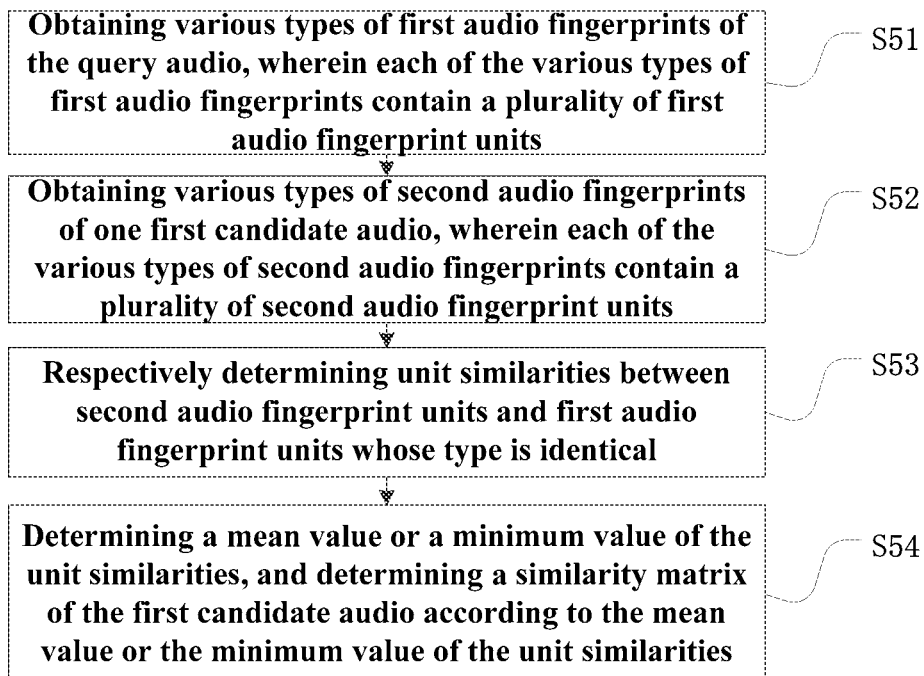
FIG. 8 is a flowchart of determining a similarity matrix based on various types of first audio fingerprints and second audio fingerprints provided by an embodiment of the disclosure.

FIG. 8 is a schematic flowchart of determining the similarity matrix based on various types of first audio fingerprints and second audio fingerprints to carry out audio retrieval provided by one embodiment of the disclosure. Referring to FIG. 8, in one embodiment of the disclosure, the audio retrieval and recognition method disclosed by the disclosure includes the following steps.

Step S51, various audio fingerprint extraction methods are utilized to obtain various types of first audio fingerprints of the query audio; each type of first audio fingerprints contains a plurality of first parts which are used for showing audio content features and are called first audio fingerprint units, and optionally, at least certain types of first audio fingerprints contain a second part used for showing the credibility of the first part. For example, the audio fingerprints, which are obtained according to S11-17 in the above embodiments, of the query audio as well as other types of audio fingerprints are simultaneously obtained. Then the process will advance to step S52.

Step S52, various types of second audio fingerprints of one known audio (which specifically can be the audio in the above first candidate audio collection) are obtained; each type of second audio fingerprints contains a plurality of first parts which are used for showing audio content features and are called second audio fingerprint units, and optionally, at least certain types of second audio fingerprints contain a second part used for showing the credibility of the first part. For example, the audio fingerprints, which are obtained according to S11 to S17 in the above embodiment, of the known audio as well as other types of audio fingerprints are simultaneously obtained. Then the process will advance to step S53.

Step S53, a method similar to S42 of the above embodiment is utilized to independently determine the single similarity between the same type of second audio fingerprint unit and first audio fingerprint unit, and therefore, various unit similarities of one individual of known audio can be obtained by corresponding to various types of audio fingerprints. Then the process will advance to step S54.

Step S54, the mean value or the minimum value of various unit similarities is determined; and a method similar to S43 of the embodiment is utilized to determine the similarity matrix of the known audio according to the mean value or the minimum value of various unit similarities.

Then, the process enters S44 of the above example, and the following steps of determining the sequence similarity score according to the similarity matrix based on the mean value or the minimum value of various unit similarities, determining the result of the second ranking and the like are carried out in S44.

An effect obtained by utilizing the mean value or the minimum value of various unit similarities to determine the similarity matrix is that a mismatch situation may be in the presence when the similarity obtained by a single type of audio fingerprint is used for carrying out audio retrieval and recognition, and the mean value or the minimum value of the similarities of various audio fingerprints can be used for reducing or eliminating the mismatch problem so as to improve the accuracy of the audio retrieval and recognition.

What needs to be illustrated is that various unit similarities need to be guaranteed to own a consistent value range before the mean value or the minimum value of various unit similarities is taken. For example, the value ranges of all types of unit similarities can be set to be 0 to 1 in advance.

In fact, the above example for determining the unit similarities according to the Hamming distance sets the value range of the unit similarities to be between 0 and 1.

In certain embodiments of the disclosure, the audio retrieval and recognition method also includes the following steps: before the first ranking is carried out, slicing the obtained first audio fingerprint of the query audio and the second audio fingerprint of the known audio according to preset fixed length to obtain a plurality of first sub audio fingerprints with the same length (including the same quantity of audio fingerprint units) and second sub audio fingerprints (for example, slicing is carried out before indexing in the embodiment which contains a step of carrying out indexing on the second audio fingerprint); and/or before the audio fingerprint is obtained, slicing the query audio and the known audio according to a preset fixed time span to obtain a plurality of query audio clips and known audio clips with the same time span; then, independently acquiring the audio fingerprint of each query audio clip and the audio fingerprint of each known audio clip, acquiring the first sub audio fingerprint of each query audio clip and the second sub audio fingerprint of each known audio clip; and then, according to each first sub audio fingerprint and each second sub audio fingerprint, carrying out the above steps of first ranking and second ranking to obtain the recognition result of each sub audio fingerprint, and then, determining the recognition result of the original query audio according to the recognition result of each sub audio fingerprint.

An effect obtained by slicing the audio or the audio fingerprint according to the fixed length is as follows: 1, the TF-IDF ranking is fairer; 2, the solved single similarity and sequence similarity score are more accurate; and 3, a uniform length is favorable for storing the audio fingerprint and the fingerprint index.

In certain embodiments of the disclosure, the arrangement of the first audio fingerprint units in the first audio fingerprint and the second audio fingerprint units in the second audio fingerprint shows timeliness. For example, the first audio fingerprint units and the second audio fingerprint units are arranged according to a time sequence. At the time, the audio retrieval and recognition method disclosed by the disclosure also includes the following steps: determining the repeated clip of the query audio and the known audio (which is specifically the audio in the above recognition result) according to the above similarity matrix; and specifically, according to the starting point and the end point of the straight line in the similarity matrix, acquiring the starting and ending time of the repeated clips in the two pieces of audio.

The specific method for determining the repeated clip according to the straight line (such as the matched straight line) in the similarity matrix can include the following steps: according to the ordinal number (or an abscissa in the similarity matrix) of the first audio fingerprint unit corresponding to the starting point of the straight line, determining the starting time of the repeated clip in the query audio; according to the ordinal number (or an ordinate in the similarity matrix) of the second audio fingerprint unit corresponding to the starting point, determining the starting time of the repeated clip in the first candidate audio; similarly, according to the abscissa of the end point of the straight line, determining the ending time of the repeated clip in the query audio; and according to the ordinate of the straight line, determining the ending time of the repeated clip in the first candidate audio.

In certain embodiments (such as the embodiments disclosed in above FIG. 6 and FIG. 7) of the disclosure, the step S44 also includes the following steps: detecting the starting part and the ending part of the obtained first matched straight line or second matched straight line, judging whether the points (unit similarities) of the starting part and the ending part of the first matched straight line/second matched straight line achieve the preset single similarity set value or not, removing the part (i.e., the single similarity is low) of which the starting part and the ending part of the first matched straight line/second matched straight line do not achieve the single similarity set value, keeping one middle piece of straight line, and defining the straight line as a third matched straight line; and according to the straight line similarity of the third matched straight line, determining the starting and ending time of the repeated clip of the known audio and the query audio. Through a way of removing the parts, with the low similarity, of the starting part and the ending part of the matched straight line and keeping one middle piece of straight line with the high similarity, the similar situation of the known audio and the query audio is determined; the accuracy of the audio retrieval and recognition can be improved, and the accurate repeated clip can be obtained.

The specific method for removing the part, which does not achieve the single similarity set value, of the starting part and the ending part of the matched straight line can include the following steps: inspecting from the starting point/end point of the matched straight line to the middle in sequence to judge whether the single similarity set value is achieved or not; and after the first point which achieves the single similarity set value is found, removing a plurality of points between the point and starting point/end point.

What calls for attention is that the single similarity set value can be the specific numerical value of one single similarity, and whether one point achieves the numerical value or not is judged during inspection; and the single similarity set value also can be a scale value, and during inspection, whether a ratio of one point to the mean value or the maximum value of all points contained in the first matched straight line/second matched straight line achieves the scale value or not is judged.

Figure 9:
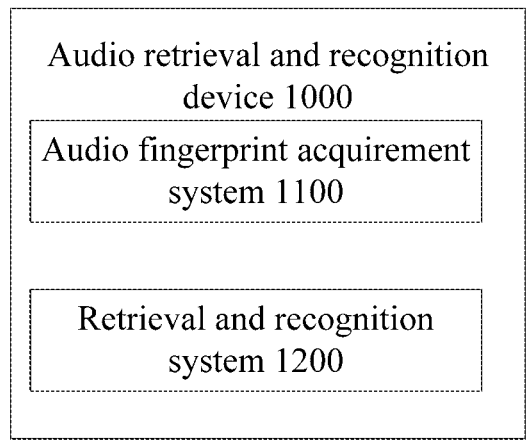
FIG. 9 is a structural block diagram of an audio retrieval and recognition device of an embodiment of the disclosure.

FIG. 9 is a structural block diagram of an audio retrieval and recognition device 1000 of an embodiment of the disclosure. Referring to FIG. 9, the audio retrieval and recognition device 1000 exemplified in the disclosure mainly includes an audio fingerprint acquirement system 1100 configured for acquiring an audio fingerprint of query audio and a retrieval and recognition system configured for recognizing the query audio according to the audio fingerprint to obtain a recognition result.

The audio fingerprint includes a first part configured for indicating a content feature of the query audio and a second part configured for indicating credibility of the first part.

Figure 10:
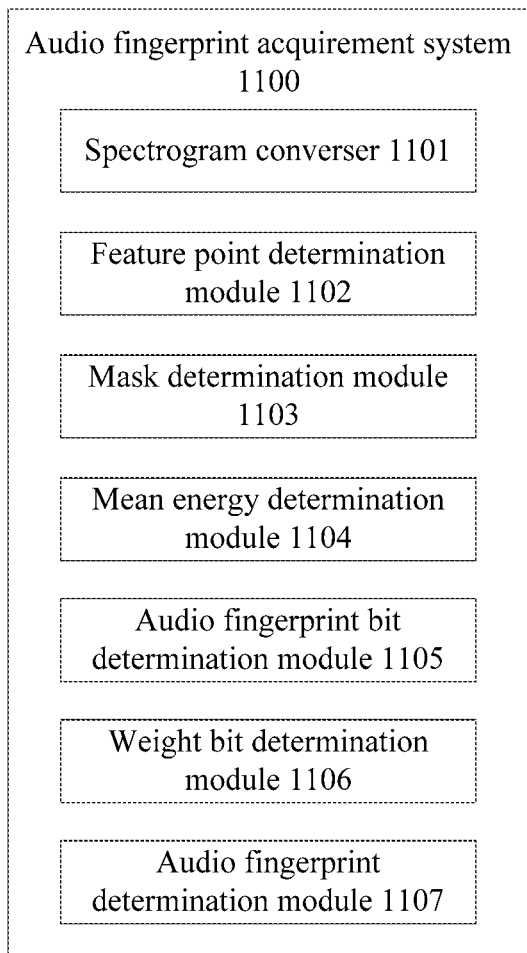
FIG. 10 is a structural block diagram of an audio fingerprint acquirement system provided by an embodiment of the disclosure.

FIG. 10 is a structural block diagram of an audio fingerprint acquirement system 1100 provided by an embodiment of the disclosure. Referring to FIG. 10, the audio fingerprint acquirement system 1100 exemplified in the disclosure mainly includes a spectrogram converser 1101, a feature point determination module 1102, a mask determination module 1103, a mean energy determination module 1104, an audio fingerprint bit determination module 1105, a weight bit determination module 1106 and an audio fingerprint determination module 1107.

The spectrogram converser 1101 is used for converting the audio into the spectrogram. Specifically, the spectrogram converser 1101 can be specifically used for converting an audio signal into a time-frequency spectrogram by the fast Fourier transformation.

In the embodiment of the disclosure, the spectrogram converter 1101 can include an MEL transformation submodule, which is used for preprocessing the spectrogram by the MEL transformation; the spectrogram can be divided into a plurality of frequency bins through the MEL transformation, and the number of the divided frequency bins can be configured. In addition, the spectrogram converter 1101 also can include a human auditory system filtering submodule used for carrying out human auditory system filtering on the spectrogram, and frequency spectrum distribution is more suitable for auditory perception by nonlinear transformation, including human auditory system filtering and the like.

The feature point determination module 1102 is used for determining a feature point in the spectrogram.

Specifically, the feature point determination module 1102 can be specifically used for adopting one of various standards to determine the feature point. For example, the maximum value point of energy in the spectrogram, or the minimum value point of energy can be selected as the feature point.

In the embodiment of the disclosure, the feature point determination module 1102 may not select the extreme value point of the energy as the feature point but is used for selecting a fixed point as the feature point. For example, the point (with fixed frequency) of which the frequency value is equal to the preset frequency set value can be selected. Furthermore, the feature point determination module 1102 can be used for presetting a plurality of frequency set values of low frequency, intermediate frequency and high frequency according to values of frequencies.

The mask determination module 1103 is used for determining one or a plurality of masks for the feature point on the spectrogram near the feature point, and each mask includes a plurality of spectrum areas. Specifically, in the spectrogram, the plurality of spectrum areas contained in each mask can be symmetrically distributed.

The mean energy determination module 1104 is used for determining the mean energy of the spectrum areas.

The audio fingerprint bit determination module 1105 is used for determining the audio fingerprint bit according to the mean energy of the plurality of spectrum areas in the mask. What calls for attention is that the audio fingerprint bit is the foregoing first part used for showing the content feature of the audio in the audio fingerprint.

In the embodiment of the disclosure, the audio fingerprint bit determination module 1105 can be specifically used for determining an audio fingerprint bit according to the difference value of the mean energy of the plurality of spectrum areas contained in one mask.

The weight bit determination module 1106 is used for judging the credibility of the audio fingerprint bit to determine the weight bit corresponding to each audio fingerprint bit. What calls for attention is that the weight bit is the above second part used for showing the credibility of the first part in the audio fingerprint.

In the embodiment of the disclosure, if the audio fingerprint bit is determined according to the difference value of the mean energy of the plurality of spectrum areas contained in one mask, the weight bit determination module 1106 is specifically used for judging whether the absolute value of the difference value used for generating the audio fingerprint bit achieves (or exceeds) the preset bit threshold value or not; if the absolute value of the difference value used for generating the audio fingerprint bit achieves the bit threshold value, the audio fingerprint bit is determined as a strong bit, and a weight bit which corresponds to the audio fingerprint bit is obtained; the value of the weight bit is 1; if the absolute value of the difference value used for generating the audio fingerprint bit does not achieve the bit threshold value, the audio fingerprint bit is determined as a weak bit, and a weight bit which corresponds to the audio fingerprint bit is obtained; the value of the weight bit is 0.

The audio fingerprint determination module 1107 is used for determining the audio fingerprint of the audio according to the audio fingerprint bit and the weight bit.

While the audio fingerprint bit is extracted, the weight bit corresponding to the audio fingerprint bit is extracted, and the audio fingerprint with high accuracy and good robustness can be generated for one individual of audio.

Optionally, the audio fingerprint acquiring system 1100 also includes a timestamp adding module (which is not shown in the figure) which is used for adding a timestamp field to the audio fingerprint; the timestamp field is used for showing a time difference between the audio starting position and the feature point and can be a hash value, and if the feature point is set as a fixed point, the module does not need to be contained, i.e., the timestamp does not need to be recorded.

Optionally, the audio fingerprint acquiring system 1100 also includes an audio identification adder (which is not shown in the figure) which is used for adding an audio identification field to the audio fingerprint; the audio identification field is used for recording the ID information of the audio signal corresponding to the audio fingerprint, and the field can be a hash value.

Optionally, the audio fingerprint acquiring system 1100 also includes an audio segmentation module (which is not shown in the figure) and an audio fingerprint combination module (which is not shown in the figure); the audio segmentation module is used for dividing the original audio into multiple pieces of sub-audio according to time; the modules contained in the above audio fingerprint acquiring system 1100 are used for extracting the audio fingerprint from each piece of sub audio to obtain a plurality of audio fingerprints; and the audio fingerprint combination module is used for combining the extracted audio fingerprints of all pieces of sub-audio to obtain the audio fingerprint of the whole piece of audio.

In order to be convenient for narration and understanding, the audio fingerprint of the query audio can be called the first audio fingerprint, and the audio fingerprint units contained in the first audio fingerprint are called first audio fingerprint units, and the weight units corresponding to the first audio fingerprint units are called first weight units.

Figure 11:
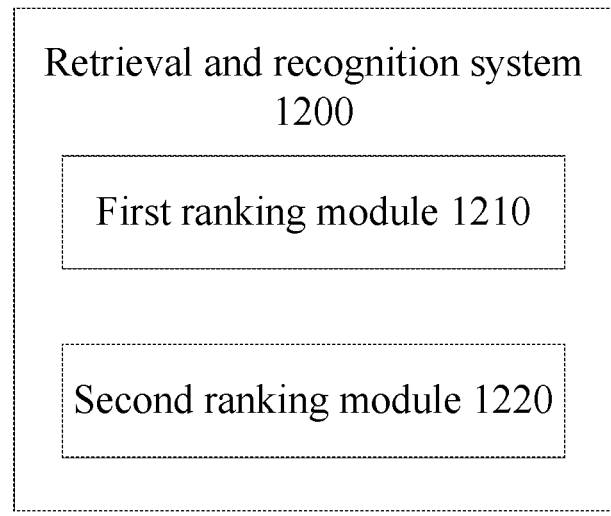
FIG. 11 is a structural block diagram of a retrieval and recognition system provided by an embodiment of the disclosure.

FIG. 11 is a schematic structure block diagram of the retrieval and recognition system 1200 provided by one embodiment of the disclosure. Referring to FIG. 11, the retrieval and recognition system 1200 of the example of the disclosure mainly includes a first ranking module 1210 used for carrying out the first ranking on a plurality of pieces of know audio according to the first audio fingerprint and taking out the first k pieces of known audio according to the result of the first ranking as a first candidate audio collection and a second ranking module 1220 used for carrying out second ranking on the first candidate audio collection according to the first audio fingerprint, and taking out the first n pieces of first candidate audio from the first candidate audio collection as a recognition result according to the result of the second ranking.

Where k is a positive integer, and the specific value of the k can be set. Specifically, the first ranking module 1210 is used for carrying out ranking according to the matching situation of each independent first audio fingerprint unit and the known audio. Furthermore, the first ranking module 1210 can be used for carrying out the term frequency-inverse document frequency (TF-IDF) ranking on the known audio according to each first audio fingerprint unit.

Where n is a positive integer, and the specific value of n is can be set. Specifically, the second module 1220 is used for carrying out ranking on the audio in the first candidate audio collection according to a plurality of first audio fingerprint units arranged in sequence.

In addition, the retrieval and recognition system 1200 can also be used for carrying out retrieval in a Meta database according to the recognition result, and can obtain the audio information, such as the name, the author, the provenance and the like, of the recognized audio, of the recognition result. When the recognition result includes multiple pieces of audio, the information of a plurality of pieces of recognized audio can be simultaneously provided.

In the embodiment of the disclosure, weighting can be carried out on the audio fingerprint units according to the weight units in the audio fingerprint when the audio fingerprint is used in a process that the first ranking module 1210 carries out first ranking and/or the second ranking module 1220 carries out second ranking.

The above known audio can be audio in one audio database. The audio database stores the audio fingerprints of the known audio; in addition, the audio fingerprints of the stored known audio include audio fingerprints which are obtained by the same extraction method with the first audio fingerprint and have the same type with the first audio fingerprint, so that the audio fingerprints of the known audio also include a first part used for showing the content features of the audio and a second part used for showing the credibility of the first part.

In certain embodiments of the disclosure, the audio retrieval and recognition device 1000 of the disclosure also includes a finger index acquirer (which is not shown in the figure); the finger index acquirer is used for acquiring the audio fingerprints of a plurality of pieces of known audio; in order to be convenient for narration and understanding, the audio fingerprints of the known audio can be called the second audio fingerprint, and the audio fingerprint units contained in the second audio fingerprint are called second audio fingerprint units, and the weight units contained in the second audio fingerprint are called second weight units; and the second audio fingerprints are indexed to obtain the fingerprint indexes of the known audio in advance. The first ranking module 1210 is specifically used for matching the fingerprint indexes with the first audio fingerprint units of the query audio to carry out TF-IDF ranking on the plurality of pieces of known audio.

Furthermore, the fingerprint index acquirer can be used for acquiring the forward index and the inverted index of the audio fingerprint of the known audio.

What calls for attention is that the fingerprint index acquirer can be used for carrying out indexing on the second audio fingerprint according to the weight to improve robustness.

In addition, if all pieces of known audio in the audio database are subjected to first ranking, retrieval and recognition efficiency may be affected, so that the first ranking module 1210 of the disclosure can include an exact match submodule 1211 used for carrying out extract match on the known audio in the audio database before first ranking.

Figure 12:
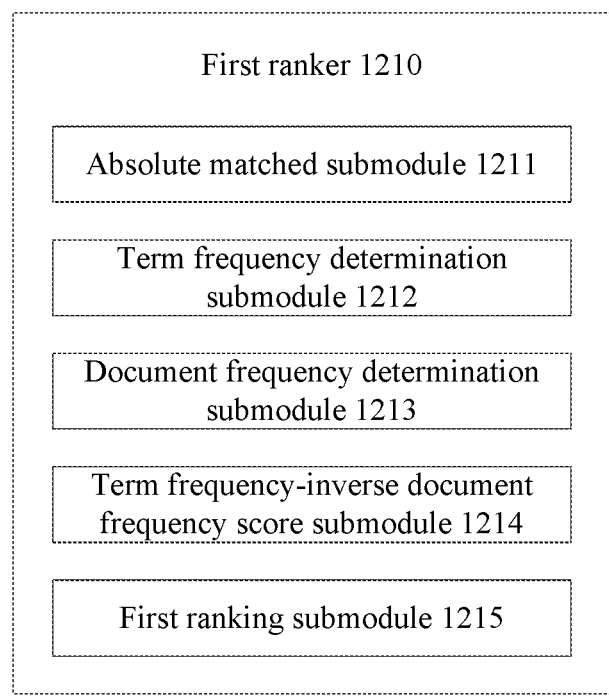
FIG. 12 is a structural block diagram of a first ranking module provided by an embodiment of the disclosure.

FIG. 12 is a structural block diagram of a first ranking module provided by an embodiment of the disclosure. Referring to FIG. 12, in one embodiment of the disclosure, the first ranking module 1210 specifically includes an absolute matched submodule 1211 used for carrying out statistics on the second audio fingerprints, in which first audio fingerprint units appear, of the known audio according to the inverted index so as to match the known audio which contain more than a preset quantity of first audio fingerprint units as a second candidate audio collection, a term frequency determination submodule 1212 used for determining the term frequency of one first audio fingerprint unit in the second audio fingerprint of one individual of second candidate audio based on the forward index; a document frequency determination submodule 1213 used for determining the document frequency of the first audio fingerprint unit based on the inverted index, a term frequency-inverse document frequency 1214 used for determining the term frequency-inverse document frequency score of the second candidate audio according to the term frequency of each first audio fingerprint unit in the second audio fingerprint of one individual of second candidate audio and the document frequency of each first audio fingerprint unit, and a first ranking submodule 1215 used for carrying out ranking on the second candidate audio collection according to the obtained term frequency-inverse document frequency scores of second candidate audio to obtain the result of the first ranking, and taking out the first k pieces of second candidate audio from the result of the first ranking as a first candidate audio collection.

What calls for attention is that the exact match submodule 1211 can be specifically used for only judging the matching situation of the strong bit in the first audio fingerprint unit in the second audio fingerprint of the known audio according to the weight unit corresponding to the first audio fingerprint unit but ignoring the matching situation of the weak bit in the first audio fingerprint unit to improve robustness.

What calls for attention is that the forward index can be the above fingerprint index obtained according to the weight.

What calls for attention is that the inverted index can be the above fingerprint index obtained according to the weight.

The first ranking submodule 1215 also can be used for returning the second audio fingerprint (forward index) of each first candidate audio to the second ranking module 1220 for subsequent further processing.

In certain embodiments of the disclosure, the second ranking is carried out on the audio in the first candidate audio collection according to the occurrence situation of a sequence which is formed by a plurality of first audio fingerprint units arranged in sequence and has a sequential order in the audio fingerprint of the first candidate audio. Specifically, the second ranking module 1220 is used for acquiring the similarity matrix of audio in the first candidate audio collection according to the fingerprint indexes of the known audio and the first audio fingerprint and carrying out ranking on the audio in the first candidate audio collection according to the similarity matrix. What calls for attention is that the second ranking module 1220 can be specifically used for carrying out weighing on weight corresponding to the first audio fingerprint and/or weight in the finger indexes of the known audio in a similarity matrix determining process, and the weighted similarity matrix is used for carrying out ranking on the audio in the first candidate audio collection to improve robustness.

Figure 13:
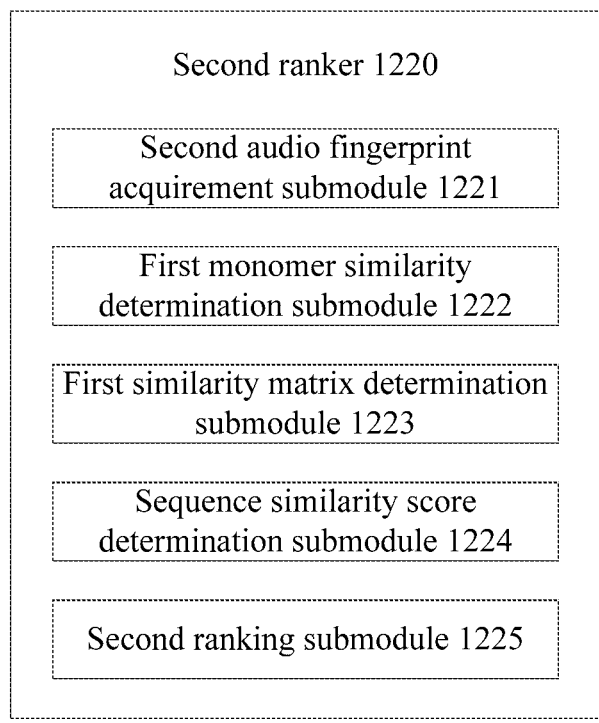
FIG. 13 is a structural block diagram of a second ranking module provided by an embodiment of the disclosure.

FIG. 13 is a structural block diagram of a second ranking module 1220 provided by an embodiment of the disclosure. Referring to FIG. 13, in one embodiment of the disclosure, the second ranking module 1220 specifically includes a second audio fingerprint acquiring submodule 1221 used for acquiring the second audio fingerprint of one individual of first candidate audio (in fact, each candidate audio is the known audio) in the first candidate audio collection, a first unit similarity determination submodule 1222 used for determining a single similarity between each second audio fingerprint unit contained in the second audio fingerprint of the first candidate audio and each first audio fingerprint unit, a first similarity matrix determination submodule 1223 used for determining a similarity matrix between the first candidate audio and the query audio according to each single similarity, a sequence similarity score determination submodule 1224 used for determining the sequence similarity score of the first candidate audio according to the similarity matrix of one individual of first candidate audio, and a second ranking submodule 1225 used for independently carrying out ranking on the first candidate audio collection according to the sequence similarity score of each first candidate audio to obtain the result of the second ranking.

Specifically, the second audio fingerprint can be obtained according to the fingerprint index (such as the forward index) of the known audio, in certain examples of the disclosure, the first audio fingerprint contains the weight unit (called first weight unit) corresponding to each audio fingerprint unit, and/or the second audio fingerprint contains the weight unit (called second weight unit) corresponding to each second audio fingerprint unit.

What calls for attention is that the single similarity first determination submodule 1222 can be specifically used for carrying out weighing on each first audio fingerprint unit and each second audio fingerprint unit according to the first weight unit and/or second weight unit in a process of determining the single similarity and can be used for determining the single similarity according to the weighted first audio fingerprint unit and second audio fingerprint unit, and in one example of the disclosure, since the accuracy of data information in the audio database is higher, the second weight unit can be independently used for carrying out weighting on the first audio fingerprint unit and the second audio fingerprint unit.

Specifically, the sequence similarity score determination submodule 1224 is used for determining the sequence similarity score according to a straight line in the similarity matrix.

The first n pieces of first candidate audio are taken out from the result of the second ranking as a recognition result.

In one embodiment of the disclosure, the sequence similarity score determination submodule 1224 is specifically used for determining the sequence similarity score by all specific steps of the above constant speed audio method.

In one embodiment of the disclosure, the sequence similarity score determination submodule 1224 is specifically used for determining the sequence similarity score by all specific steps of the above dynamic planning method.

Figure 14:
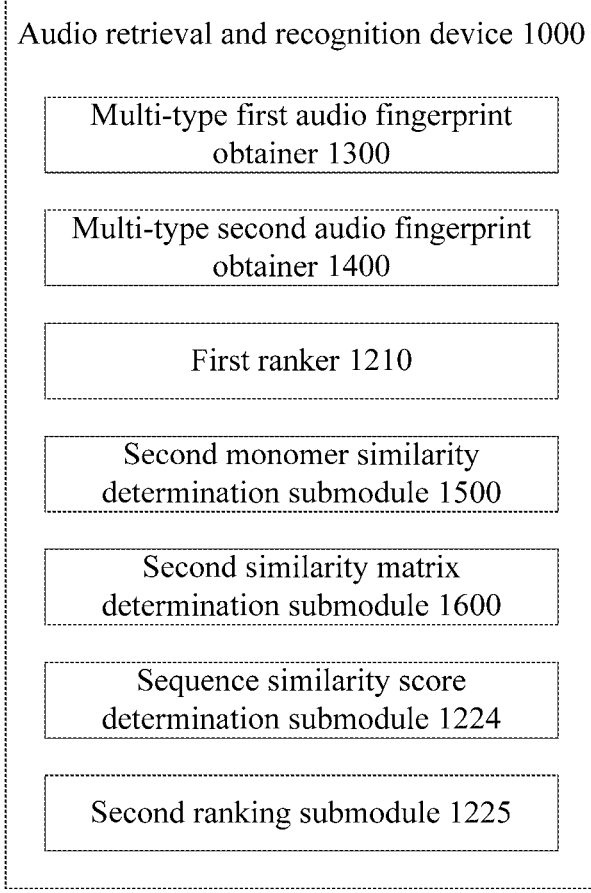
FIG. 14 is a structural block diagram of an audio retrieval and recognition device of determining a similarity matrix based on various types of first audio fingerprints and second audio fingerprints of an embodiment of the disclosure.

Furthermore, the similarity matrix can be obtained by the comprehensive consideration of various audio similarities. FIG. 14 is a structural block diagram of an audio retrieval and recognition device 1000 of determining a similarity matrix based on various types of first audio fingerprints and second audio fingerprints of an embodiment of the disclosure. Referring to FIG. 14, in one embodiment of the disclosure, the audio retrieval and recognition device 1000 of the disclosure includes a multi-type first audio fingerprint obtainer 1300 used for acquiring various types of first audio fingerprints of the query audio by various audio fingerprint acquiring methods, a multi-type second audio fingerprint obtainer 1400 used for acquiring various types of second audio fingerprints of one individual of known audio (which specifically can be audio in the above first candidate audio collection), a second unit similarity determination submodule 1500 used for independently determining a single similarity between second audio fingerprint units and first audio fingerprint units of the same type, and a similarity matrix second determination submodule 1600 used for determining the mean value or the minimum value of various unit similarities and determining the similarity matrix of the known audio according to the mean value or the minimum value of various unit similarities.

Each type of first audio fingerprint includes a plurality of first parts, which are called the first audio fingerprint units, used for showing audio content features, and optionally, at least certain types of first audio fingerprints contain second parts used for showing the credibility of the first parts.

Each type of second audio fingerprint contains a plurality of first parts, which are called second audio fingerprint units, used for showing audio content features, and optionally, at least certain types of second audio fingerprints contain second parts used for showing the credibility of the first parts.

Various unit similarities of one individual of known audio can be obtained by corresponding to various types of audio fingerprints.

Therefore, the above sequence similarity score determination submodule 1224 is used for determining the sequence similarity score according to the similarity matrix based on the mean value or the minimum value of various unit similarities.

In certain embodiments of the disclosure, the audio retrieval and recognition device 1000 also includes an audio divider (which is not shown in the figure). The audio divider is used for slicing the obtained first audio fingerprint of the query audio and the second audio fingerprint of the known audio according to a set fixed length before the first ranking so as to obtain a plurality of first sub audio fingerprints and second sub audio fingerprints of the same length (including the same quantity of audio fingerprint units); and/or, the audio divider is used for slicing the query audio and the known audio in advance according to a preset fixed time span to obtain multiple query audio clips and known audio clips with the same time span before the audio fingerprint is obtained; then, the audio fingerprints of each query audio clip and each known audio clip can be independently obtained, and the first sub audio fingerprint of each query audio clip and the second sub audio fingerprint of each known audio clip are obtained. The step of carrying out the above first ranking and second ranking respectively by the above first ranking module 1210 and the above second ranking module 1220 is used for acquiring the recognition result of each sub audio fingerprint according to each first sub audio fingerprint and each second sub audio fingerprint, and then, the recognition result of the original query audio can be determined according to the recognition result of each sub audio fingerprint.

In certain embodiments of the disclosure, the first audio fingerprint units in the first audio fingerprints and the second audio fingerprint units in the second audio fingerprints exhibit timeliness on an aspect of arrangement. At the time, the audio retrieval and recognition device 1000 of the disclosure also includes a repeated audio clip determination module (which is not shown in the figure); the repeated audio clip determination module is used for determining the repeated clips of the query audio and the known audio according to the above similarity matrix. Specifically, the repeated audio clip determination module is specifically used for acquiring the starting and ending time of the repeated clips of two pieces of audio according to the starting point and the end point of the straight line in the similarity matrix.

Figure 15:
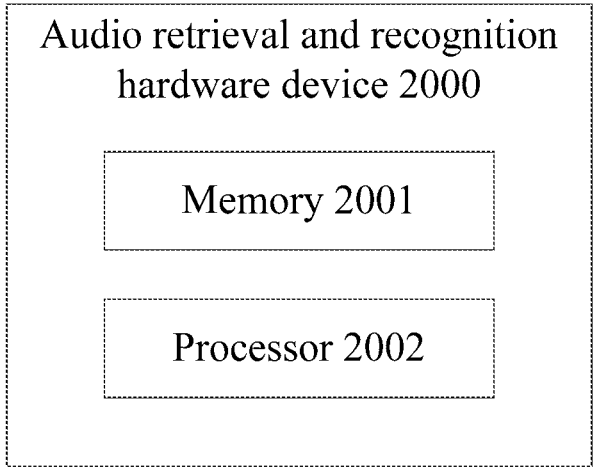
FIG. 15 is a hardware block diagram of an audio retrieval and recognition hardware device of an embodiment of the disclosure.

FIG. 15 is a hardware block diagram of an audio retrieval and recognition hardware device of an embodiment of the disclosure. As shown in FIG. 15, an audio retrieval and recognition hardware device 2000 according to the embodiment of the disclosure includes a memory 2001 and a processor 2002. Each component in the audio retrieval and recognition hardware device 2000 are mutually connected by a bus system and/or other forms of connectors (not shown).

The memory 2001 is configured for storing non-transitory computer readable instructions. Specifically, the memory 2001 can include one or more computer programs. The computer programs can include various forms of computer readable storage medium, such as a volatile memory and/or a non-volatile memory. The volatile memory can include a random access memory (RAM) and/or a cache. The non-volatile memory can include a read only memory (ROM), a hard disk, a flash, etc.

The processor 2002 can be a central processing unit (CPU) or other forms of processors with abilities to process data and/or execute instructions, as well as controlling other components in the audio retrieval and recognition hardware device 2000 to provide expected functions. In an embodiment of the disclosure, the processor 2002 is configured for running the computer readable instructions stored in the memory 2001, so that the audio fingerprint extraction hardware device 2000 performs all or a part of steps of the audio retrieval and recognition method of each embodiment of the disclosure.

Figure 16:
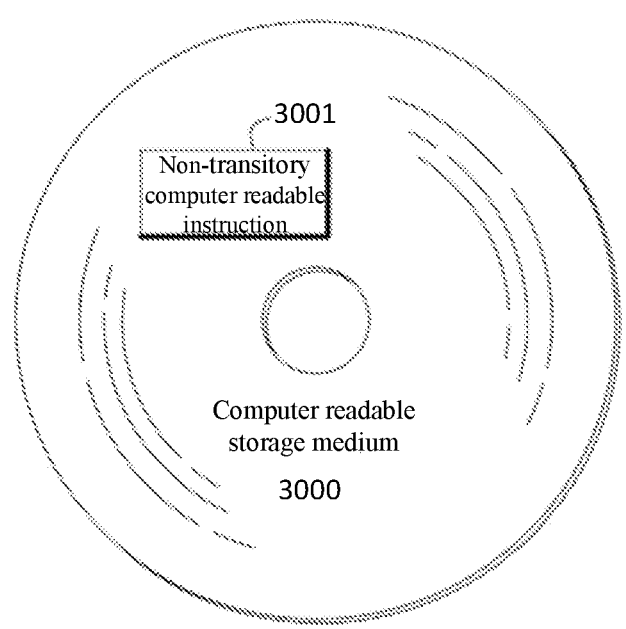
FIG. 16 is a schematic view of a computer readable storage medium of an embodiment of the disclosure.

FIG. 16 is a schematic view of a computer readable storage medium of an embodiment of the disclosure. As shown in FIG. 16, a computer readable storage medium 3000 according to the embodiment of the disclosure stores a non-transitory computer readable instruction 3001. When the non-transitory computer readable instruction 3001 is operated by a processor, all or a part of steps of the audio retrieval and recognition method of each embodiment of the disclosure will be executed.

Figure 17:
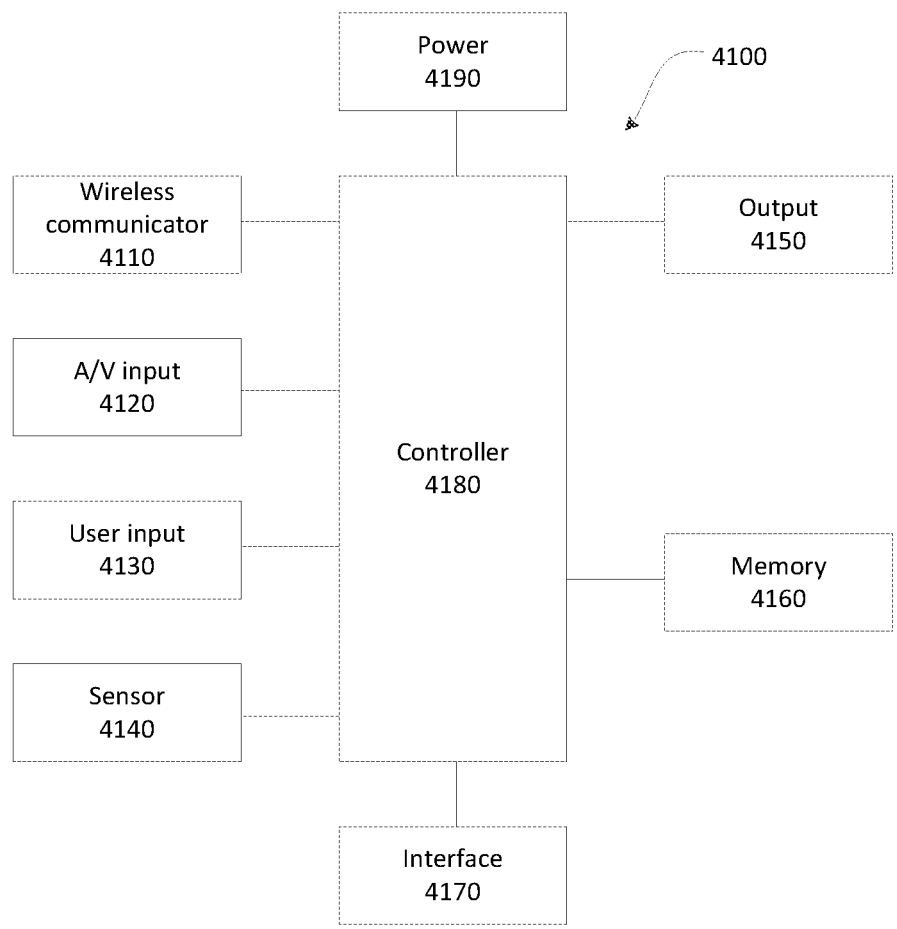
FIG. 17 is a structural block diagram of a terminal device of an embodiment of the disclosure.

FIG. 17 is a structural block diagram of terminal device of an embodiment of the disclosure. The terminal device can be implemented in various forms. The terminal device in the disclosure can include but not limit to a mobile terminal device such as a mobile phone, a smart phone, a laptop, a digital broadcast receiver, a personal digital assistant (PDA), a pad, a portable multimedia player (PMP), a navigation device, a vehicle terminal device, a vehicle display terminal and a vehicle digital rearview mirror, and a fixed terminal device such as a digital TV, a computer and so on.

As shown in FIG. 17, a terminal device 4100 can include a wireless communicator 4110, an audio/video (A/V) input 4120, a user input 4130, a sensor 4140, an output 4150, a memory 4160, an interface 4170, a controller 4180 and a power 4190. FIG. 17 shows a terminal device with various components, but it should be understood that not all components are required to be included; more or less components can be substitution.

The wireless communicator 4110 permits the radio communication between the terminal device 4100 and a wireless communication system or network. The A/V input 4120 is configured for receiving audio or video signals. The user input 4130 can input data according to a instruction generator input by a user to control various operations of the terminal device. The sensor 4140 detects the current state of the terminal device 4100, a position of the terminal device 4100, a touch input from a user to the terminal device 4100, the orientation of the terminal device 4100, accelerating or decelerating movement or direction of the terminal device 4100, and generates an instruction or signal configured for controlling operations of the terminal device 4100. The interface 4170 acts as an interface that at least one external device and terminal device 4100 can go through. The output 4150 is formed to provide output signals in visual, audio and/or touch manners. The memory 4160 can store software programs processed and controlled by the controller 4180, or temporarily store output data or data to be output. The memory 4160 can include at least one type of storage medium. And the terminal device 4100 can cooperate with a web storage device connected with the memory 4160 over the network to perform the storing function. The controller 4180 generally controls the overall operation of the terminal device. Moreover, the controller 4180 can include a multimedia module configured for re-presenting or re-playing multimedia data. The controller 4180 can execute a pattern recognition process to recognize hand input or image drawing input on the touch screen to be a character or an image. The power 4190 receives external electricity or internal electricity governed by the controller 4180 and provides proper electricity to manipulate each component and element.

Various embodiments of the audio fingerprint extraction method provided by the disclosure can be implemented by computer software, hardware or computer readable medium of any combination. With respect to the hardware execution, various embodiments of the audio fingerprint extraction method provided by the embodiments of the disclosure can be processed by at least one of an application specific integrated circuit (ASIC), a digital signal processor (DSP), a digital signal processing device (DSPD), a programmable logic device (PLD), a field programmable gate array (FPGA), a processor, a controller, a microcontroller, a microprocessor and an electrical unit designed for executing the functions described herein. In some cases, each embodiment of the audio fingerprint extraction method provided by the disclosure can be performed in the controller 4180. With respect to software execution, various embodiments of the audio fingerprint extraction method provided by the embodiments of the disclosure can be performed with an individual software module allowing at least one function or operation. The software codes can be implemented by a software application program written by any proper programming language. The software codes can be stored in the memory 4160 and performed by the controller 4180.

According to the audio fingerprint extraction method, device, hardware device, computer readable storage medium and terminal device of the embodiments of the disclosure, the audio fingerprint bit is extracted by the mask, and the corresponding weight bit is extracted, which can significantly enhance the accuracy of audio fingerprint extraction and efficiency of extraction, and generate the audio fingerprint with superior audio fingerprint with excellent robustness for the audio signal. As a result, the audio comparison, audio search, audio deduplication and audio surveillance obtained by the audio fingerprint extraction method based on the disclosure can have the higher accuracy, the higher efficiency and better robustness.

According to the audio retrieval and recognition method, device, hardware device, computer readable storage medium and terminal device, the audio retrieval and recognition can be achieved by obtaining and using audio fingerprint features containing the first part configured for indicating audio content features and the second part configured for indicating credibility of the first part of the audio object, which can significantly enhance the accuracy, robustness and efficiency in retrieving and recognizing audio.

The fundamental principle of the disclosure is described incorporated with concrete embodiments; however, it needs to point out that advantages, superiorities and effects mentioned in the disclosure merely are examples rather than limitation; it is unreasonable to regard the advantages, superiorities and effects as requisite. Moreover, the forgoing disclosed concrete details only are exemplary for better understanding rather than limitation. The forgoing details will not restrict the disclosure to employ the detail above.

Block diagrams of elements, devices, facilities and systems in the disclosure are only exemplary example without intending or implying to connect, arrange or dispose strictly according to the method shown in the block diagrams. The elements, devices, facilities and systems can be connected, arranged or disposed in any manner known by a person skilled in the art. Words such as "comprise", "include" and "have" are unrestricted words, which indicate "include without excluding", capable of mutual substitution. Words "or" and "and" depict "and/or", which are able to mutually substitute, unless otherwise specified. The word "such as" indicates the phrase "such as but not limit to", which can be mutually substituted.

Furthermore, "or" used in a list starting with "at least one" indicates discrete examples, so that "at least one of A, B or C" means A or B or C, or AB or AC or BC, or ABC (namely A and B and C). Moreover, the expression "exemplary" does not mean the example to be preferred or better than other examples.

It needs to point out that each component or each step can be divided and/or re-assorted in the system and method of the disclosure. The division and/or re-association should be regarded as equivalence to the disclosure.

The technology defined by the claims can be modified, replaced and altered. Moreover, the range of the claims of the disclosure is unrestricted to specific aspects of combination, manners, methods and operations of forgoing processes, apparatuses, fabrication and events. The almost same function or result can be achieved by utilizing the combination, manners, methods and operations of forgoing processes, apparatuses, fabrication and events. Therefore, the attached claims include the combination, manners, methods and operations of forgoing processes, apparatuses, fabrication and events.

The disclosed aspects provided as above enable a person skilled in the art to attain or use the disclosure. Various modifications are obvious to a person skilled in the art, and a general principle defined herein can be applied to other aspects without exceeding the range of the disclosure. Therefore, the disclosure does not intend to be restricted to the shown aspects, which should cover the widest range according to the disclosed principle and novel features.

The description above is provided for a purpose of illustration. Moreover, the description does not intend to restrict embodiments of the disclosure as the disclosed forms. Although multiple examples and embodiments are debated, a person skilled in the art is able to acquire some modification, alteration, transformation, addition and sub-combination.

The invention claimed is:

1. An audio retrieval and recognition method, wherein the audio retrieval and recognition method comprises:
   acquiring an audio fingerprint of a query audio, wherein the audio fingerprint comprises a first part configured for indicating a content feature of the query audio and a second part configured for indicating credibility of the first part, and wherein the acquiring an audio fingerprint of a query audio further comprises:
   converting the query audio to a spectrogram,
   determining a feature point in the spectrogram,
   in the spectrogram, determining one or more masks for the feature point wherein each of the one or more masks comprises a plurality of spectrum areas,
   determining mean energy of each of the plurality of spectrum areas,
   determining an audio fingerprint bit according to the mean energy of the plurality of spectrum areas in the one or more masks,
   judging credibility of the audio fingerprint bit to determine a weight bit, and
   determining the audio fingerprint of the query audio according to the audio fingerprint bit and the weight bit; and
   recognizing the query audio according to the audio fingerprint to obtain a recognition result.

2. The audio retrieval and recognition method according to claim 1, wherein the determining an audio fingerprint bit according to the mean energy of the plurality of spectrum areas in the one or more masks comprises:
   determining the audio fingerprint bit according to a difference value of the mean energy of the plurality of spectrum regions comprised in the one or more masks.

3. The audio retrieval and recognition method according to claim 2, wherein the judging credibility of the audio fingerprint bit to determine a weight bit comprises:
   judging if an absolute value of the difference value attains or exceeds a pre-set weight bit threshold or not, if it attains or exceeds the pre-set weight bit threshold, determining the audio fingerprint bit to be a strong bit, or else determining the audio fingerprint bit to be a weak bit; determining the weight bit according to the audio fingerprint bit is the strong bit or the weak bit.

4. The audio retrieval and recognition method according to claim 1, wherein the audio fingerprint of the query audio is defined as a first audio fingerprint; the first audio fingerprint comprises a plurality of first audio fingerprint units and first weight units corresponding to the plurality of first audio fingerprint units; the first audio fingerprint units comprise the plurality of audio fingerprint bits of the query audio; the first weight units comprise the plurality of weight bits corresponding to the plurality of audio fingerprint bits.

5. The audio retrieval and recognition method according to claim 4, wherein the recognizing the query audio according to the audio fingerprint comprises:
   carrying out a first ranking on a plurality of known audio according to each of the plurality of first audio fingerprint units, according to a result of the first rank, selecting first k individuals of the plurality of known audio as a first candidate audio collection, where k is a positive integer; and
   carrying out a second ranking on the first candidate audio collection according to the first audio fingerprint units sequentially arranged, according to a result of the second rank, selecting first n individuals of the first candidate audio collection as the recognition result, where n is a positive integer.

6. The audio retrieval and recognition method according to claim 5, wherein the audio retrieval and recognition method further comprises:
   pre-acquiring audio fingerprint of the plurality of known audio as second audio fingerprints; wherein the second audio fingerprints comprise a plurality of second audio fingerprint units and second weight units corresponding to the plurality of second audio fingerprint units; and pre-acquiring fingerprint indexes of the plurality of known audio by indexing the second audio fingerprints.

7. The audio retrieval and recognition method according to claim 6, wherein during carrying out the first ranking or the second ranking, according to the first weight units and/or the second weight units, the plurality of first audio fingerprint units and/or the plurality of second audio fingerprint units are weighted.

8. The audio retrieval and recognition method according to claim 6, wherein the carrying out a first ranking on the plurality of known audio according to each of the plurality of first audio fingerprint units comprises: carrying out term frequency-inverse document frequency ranking on the plurality of known audio according to each of the plurality of first audio fingerprint units;

wherein the carrying out term frequency-inverse document frequency ranking on the plurality of known audio according to each of the plurality of first audio fingerprint units comprises:

matching the fingerprint indexes of the plurality of known audio and the plurality of first audio fingerprint units to carry out the term frequency-inverse document frequency ranking on the plurality of known audio.

9. The audio retrieval and recognition method according to claim 6, wherein the carrying out a second ranking on the first candidate audio collection according to the first audio fingerprint units sequentially arranged comprises:

acquiring a similarity matrix of audio in the first candidate audio collection according to the fingerprint indexes of the plurality of known audio and the first audio fingerprint, and ranking the audio in the first candidate audio collection according to the similarity matrix;

wherein the acquiring a similarity matrix of audio in the first candidate audio collection according to the fingerprint indexes of the plurality of known audio and the first audio fingerprint, and ranking the audio in the first candidate audio collection according to the similarity matrix comprises:

weighting by utilizing the plurality of first weight units and/or the plurality of second weight units to obtain a weighted similarity matrix, ranking the audio in the first candidate audio collection according to the weighted similarity matrix.

10. The audio retrieval and recognition method according to claim 9, wherein the acquiring an audio fingerprint of a query audio further comprises:

acquiring various types of first audio fingerprints of the query audio;

wherein the pre-acquiring audio fingerprint of the plurality of known audio as second audio fingerprints comprises: acquiring various types of second audio fingerprints of audio in the first candidate audio collection;

wherein the acquiring a similarity matrix of audio in the first candidate audio collection according to the fingerprint indexes of the plurality of known audio and the first audio fingerprint comprises: determining the similarity matrix according to the various types of first audio fingerprints and the various types of second audio fingerprints.

11. The audio retrieval and recognition method according to claim 10, wherein each of the various types of first audio fingerprints comprises a plurality of first audio fingerprint units; each of the various types of second audio fingerprints comprises a plurality of second audio fingerprint units;

wherein the determining the similarity matrix according to the various types of first audio fingerprints and the various types of second audio fingerprints comprises:

respectively determining unit similarities between the second audio fingerprint units of an identical type and the plurality of first audio fingerprint units to obtain the unit similarities of various types; and determining the similarity matrix according to a mean value or a minimal value of the various types of unit similarities.

12. The audio retrieval and recognition method according to claim 6, wherein the audio retrieval and recognition method further comprises:

pre-slicing the query audio and the plurality of known audio according to a preset time span to obtain a plurality of query sub-audio and a plurality of known sub-audio, respectively extracting audio fingerprints from the plurality of query sub-audio and the plurality of known sub-audio to obtain a plurality of first sub-audio fingerprints and a plurality of second sub-audio fingerprints whose lengths are identical;

wherein the audio retrieval and recognition method further comprises:

before carrying out the first rank, slicing the first audio fingerprints of the obtained query audio and the second audio fingerprints of the plurality of known audio according to a preset length to obtain a plurality of first sub-audio fingerprints and a plurality of second sub-audio fingerprints whose lengths are identical.

13. An audio retrieval and recognition device, wherein the audio retrieval and recognition device comprises:

a processor; and a memory communicatively coupled to the processor and storing executable instructions that upon execution by the processor cause the processor to perform operations, the operations comprising:

acquiring an audio fingerprint of a query audio; wherein the audio fingerprint comprises a first part configured for indicating a content feature of the query audio and a second part configured for indicating credibility of the first part, recognizing the query audio according to the audio fingerprint to obtain a recognition result, wherein the acquiring an audio fingerprint of a query audio further comprises:

converting the query audio to a spectrogram, determining a feature point in the spectrogram, in the spectrogram, determining one or more masks for the feature point wherein each of the one or more masks comprises a plurality of spectrum areas, determining mean energy of each of the plurality of spectrum areas, determining an audio fingerprint bit according to the mean energy of the plurality of spectrum areas in the one or more masks, judging credibility of the audio fingerprint bit to determine a weight bit, and determining the audio fingerprint of the query audio according to the audio fingerprint bit and the weight bit.

14. The audio retrieval and recognition device according to claim 13, wherein the determining an audio fingerprint bit according to the mean energy of the plurality of spectrum areas in the one or more masks comprises:

determining the audio fingerprint bit according to a difference value of the mean energy of the plurality of spectrum regions comprised in the one or more masks.

15. The audio retrieval and recognition device according to claim 13, wherein the audio fingerprint of the query audio is defined as a first audio fingerprint; the first audio fingerprint comprises a plurality of first audio fingerprint units and first weight units corresponding to the plurality of first audio fingerprint units; the first audio fingerprint units comprise the plurality of audio fingerprint bits of the query audio; the first weight units comprise the plurality of weight bits corresponding to the plurality of audio fingerprint bits.

16. The audio retrieval and recognition device according to claim 15, wherein the recognizing the query audio according to the audio fingerprint comprises:
carrying out a first ranking on a plurality of known audio according to each of the plurality of first audio fingerprint units, according to a result of the first rank, selecting first k individuals of the plurality of known audio as a first candidate audio collection, where k is a positive integer; and
carrying out a second ranking on the first candidate audio collection according to the first audio fingerprint units sequentially arranged, according to a result of the second rank, selecting first n individuals of the first candidate audio collection as the recognition result, where n is a positive integer.

17. The audio retrieval and recognition device according to claim 16, wherein the operations further comprise:
pre-acquiring audio fingerprint of the plurality of known audio as second audio fingerprints; wherein the second audio fingerprints comprise a plurality of second audio fingerprint units and second weight units corresponding to the plurality of second audio fingerprint units; and
pre-acquiring fingerprint indexes of the plurality of known audio by indexing the second audio fingerprints.

18. A non-transitory computer readable storage medium, storing computer-readable instructions that upon execution by a computer cause the computer to perform an audio retrieval and recognition method, wherein the audio retrieval and recognition method comprises:
acquiring an audio fingerprint of a query audio; wherein the audio fingerprint comprises a first part configured for indicating a content feature of the query audio and a second part configured for indicating credibility of the first part, and wherein the acquiring an audio fingerprint of a query audio further comprises:
converting the query audio to a spectrogram,
determining a feature point in the spectrogram,
in the spectrogram, determining one or more masks for the feature point wherein each of the one or more masks comprises a plurality of spectrum areas,
determining mean energy of each of the plurality of spectrum areas,
determining an audio fingerprint bit according to the mean energy of the plurality of spectrum areas in the one or more masks,
judging credibility of the audio fingerprint bit to determine a weight bit, and
determining the audio fingerprint of the query audio according to the audio fingerprint bit and the weight bit; and
recognizing the query audio according to the audio fingerprint to obtain a recognition result.

19. The non-transitory computer readable storage medium according to claim 18, wherein the determining an audio fingerprint bit according to the mean energy of the plurality of spectrum areas in the one or more masks further comprises:
determining the audio fingerprint bit according to a difference value of the mean energy of the plurality of spectrum regions comprised in the one or more masks.

20. The non-transitory computer readable storage medium according to claim 18, wherein the audio fingerprint of the query audio is defined as a first audio fingerprint; the first audio fingerprint comprises a plurality of first audio fingerprint units and first weight units corresponding to the plurality of first audio fingerprint units; the first audio fingerprint units comprise the plurality of audio fingerprint bits of the query audio; and the first weight units comprise the plurality of weight bits corresponding to the plurality of audio fingerprint bits.

* * * * *